United States Patent
Jinbo et al.

(10) Patent No.: US 6,653,000 B2
(45) Date of Patent: Nov. 25, 2003

(54) MAGNETIC RECORDING MEDIUM COMPRISING A SPECIFIC AZO DYE

(75) Inventors: Noboru Jinbo, Odawara (JP); Akihiko Takeda, Fujinomiya (JP); Takekatsu Sugiyama, Fujinomiya (JP); Tomohiro Kodama, Fujinomiya (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 104 days.

(21) Appl. No.: 09/964,700

(22) Filed: Sep. 28, 2001

(65) Prior Publication Data

US 2002/0064687 A1 May 30, 2002

(30) Foreign Application Priority Data

Sep. 29, 2000 (JP) ......................................... 2000-299711

(51) Int. Cl.$^7$ .................................................. B32B 5/16
(52) U.S. Cl. ................... 428/694 B; 428/323; 428/329; 428/694 BB
(58) Field of Search ...................... 428/694 B, 694 BB, 428/694 BR, 694 BN, 323, 329

(56) References Cited

U.S. PATENT DOCUMENTS

| | | | | |
|---|---|---|---|---|
| 5,512,363 | A | * | 4/1996 | Goto et al. |
| 5,514,465 | A | * | 5/1996 | Handa et al. |
| 5,576,266 | A | * | 11/1996 | Flosenzier et al. |
| 5,637,405 | A | * | 6/1997 | Hara et al. |

* cited by examiner

*Primary Examiner*—H. Thi Le
(74) *Attorney, Agent, or Firm*—Sughrue Mion, PLLC

(57) ABSTRACT

Provided is a magnetic recording medium that is employed to particular advantage as an external recording medium for the recording of digital data, having a layer in which carbon black is well dispersed, and in particular, a backcoat layer. A magnetic recording medium comprising a layer comprising a granular substance and a binder, wherein said layer comprises the compound denoted by general formula (I) below.

$$A-N=N-X-Y \qquad \text{General formula (I)}$$

(in general formula (I), A denotes a component forming an azo dye with X—Y; X denotes a group selected from among the divalent connecting groups denoted by the structural formulas below:

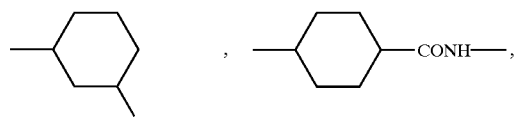
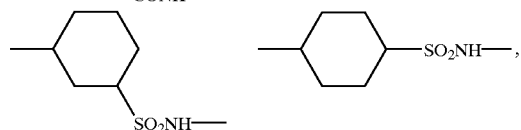
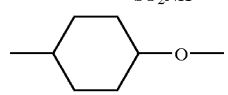

General formula (II)

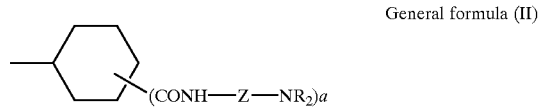

(in general formula (II), Z denotes a lower alkylene group; —NR$_2$ denotes a lower alkylamino group or a nitrogen-comprising five-membered or six-membered heterocyclic ring; and a denotes 1 or 2)).

17 Claims, No Drawings

MAGNETIC RECORDING MEDIUM COMPRISING A SPECIFIC AZO DYE

FIELD OF THE INVENTION

The present invention relates to a magnetic recording medium employed with particular advantage as an external magnetic recording medium for recording digital data.

RELATED ART

Magnetic recording media are widely employed in recording tapes, video tapes, computer tapes, disks, and the like. Magnetic recording media are becoming denser and the recording wavelengths are becoming shorter each year. There is also an examination underway as to whether to change the recording method from analog to digital.

Magnetic recording media employing a thin metal layer as the recording layer are being examined in response to the demand for higher density. However, with regard to such practical reliabilities as production properties and corrosiveness, so-called particulate magnetic recording media in which a ferromagnetic powder is dispersed in binder and coated on a support are superior. However, particulate media have poorer electromagnetic characteristics than thin metal films due to low fill rates of magnetic material.

Particulate magnetic recording media are widely employed in which a magnetic layer comprised of a ferromagnetic iron oxide, Co-modified ferromagnetic iron oxide, $CrO_2$, ferromagnetic alloy powder, or the likes dispersed in binders is coated on a support.

Numerous methods of improving the electromagnetic characteristics of particulate magnetic recording media have been proposed, such as improving the magnetic characteristics of the ferromagnetic powder and smoothing the surface. However, these are not adequate for achieving higher density. Further, in recent years, there has been a tendency to shorten the recording wavelength in combination with higher densities; the problems of thickness loss during reproduction and self-demagnetization loss, where output drops during recording as the magnetic layer becomes thinner, have become significant. Accordingly, ultrathin-layer particulate magnetic recording media have been proposed.

For example, Japanese Unexamined Patent Publication (KOKAI) Heisei No. 6-2153650 discloses relatively reducing the total thickness of the magnetic tape and the thickness of the backcoating layer. As specific examples of the magnetic tape described in this publication, in one embodiment the total thickness of the magnetic tape is 10 μm and the thickness of the backcoating layer is 0.5 μm, and in another the total thickness is 9.5 μm and the thickness of the backcoating layer is 0.5 μm. To impart antistatic and running stability properties to the backcoating layer in such embodiments, comparatively microgranular carbon black alone is employed in the former embodiment, and two types of carbon black, one being comparatively microgranular carbon black and the other being comparatively coarse carbon black, are employed in the latter embodiment.

Additionally, a magnetic tape has been proposed in which microgranular carbon black of a mean particle diameter ranging from 10 to 80 nm, coarse granular carbon black with a mean particle diameter ranging from 150 to 500 nm, and microgranular calcium carbonate of a mean particle diameter ranging from 10 to 45 nm are incorporated into the backcoating layer to achieve high surface smoothness in the backcoating layer, reduce the coefficient of friction with guide pins, and achieve good running stability (Japanese Unexamined Patent Publication (KOKAI) Heisei No. 2-7223). The further introduction into the backcoating layer of inorganic powder (for example, α-iron oxide) is also described.

Increasing the bulk recording density of particulate magnetic recording media is nearly equivalent to employing thin layers to reduce the total thickness of the tape. In particulate recording media, it is also necessary to employ thin layers in the backcoating layer; the thinner it becomes, the greater the requirements for improved dispersion and improved coating strength. Further, proper surface smoothness with repeat running stability is required. However, dispersion of the granular substances such as carbon black that are employed as the principal starting material of the backcoating layer is extremely difficult. Even when kneading treatment, sandmill dispersion, and the like are combined, there are limits to the improvement in dispersion, coating strength, and coating smoothness that can be achieved. In particulate magnetic recording media, there is also the problem of poor dispersion of granular substances in layers other than the backcoating layer.

SUMMARY OF THE INVENTION

Accordingly, the object of the present invention is to provide a magnetic recording medium that can be employed with particular advantage as an external recording medium to record digital data, having layers, particularly a backcoating layer, in which granular substances such as carbon black are well dispersed. In particular, the object of the present invention is to provide a magnetic recording medium, in which, even in a backcoating layer that has been reduced in thickness, the granular substances such as carbon black contained therein are well dispersed, and good strength and smoothness are afforded.

DETAILED EXPLANATION OF THE INVENTION

The present inventors expended considerable research effort to achieve a magnetic recording medium having a layer comprising binder and granular substances and with well-dispersed granular substances such as carbon black and with good strength and surface smoothness. As a result, they discovered that incorporating the compound denoted by general formula (I) below improved the dispersion of granular substances within the layer; the present invention was devised on that basis.

That is, the object of the present invention is achieved by a magnetic recording medium having a layer comprising a granular substance and binder, characterized in that said layer comprises the compound denoted by general formula (I) below:

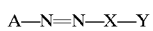   General formula (I)

(in general formula (I), A denotes a compound capable of forming an azo dye with X—Y, X denotes a group selected from the divalent connecting groups denoted by the structural formulas given below

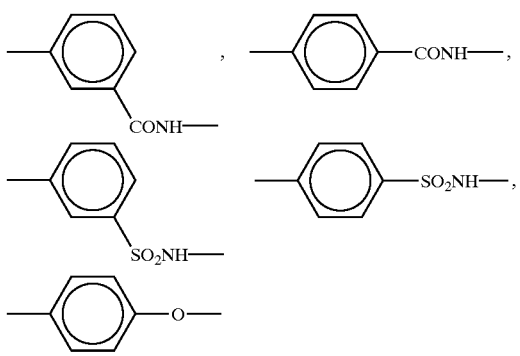

and Y denotes a group denoted by general formula (II) below

General formula (II)

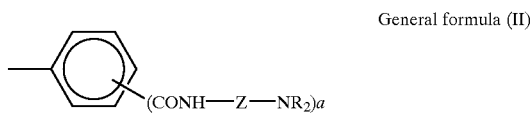

(in general formula (II), Z denotes a lower alkylene group, —$NR_2$ denotes a lower alkylamino group or a nitrogen-comprising five-membered or six-membered saturated heterocyclic ring, and a denotes 1 or 2).

Preferred Aspects of the magnetic recording medium of the present invention are given below:

1. A particulate magnetic recording medium having a nonmagnetic support, on one side of which is provided a magnetic layer, and on the other side of which is provided a backcoating layer, with the backcoating layer comprising microgranular carbon black with a mean primary particle diameter ranging from 5 to 30 nm, binder, and the compound denoted by general formula (I) above;
2. A particulate magnetic recording medium having a nonmagnetic support, on one side of which is provided a magnetic layer, and on the other side of which is provided a backcoating layer, with the backcoating layer comprising microgranular carbon black with a mean primary particle diameter ranging from 5 to 30 nm, coarse granular carbon black with a mean primary particle diameter ranging from 40 to 360 nm, binder, and the compound denoted by general formula (I) above;
3. A particulate magnetic recording medium having a nonmagnetic support, on one side of which is provided a magnetic layer, and on the other side of which is provided a backcoating layer, where the backcoating layer is formed by dispersing a mixture of microgranular carbon black with a mean primary particle diameter ranging from 5 to 30 nm, binder, the compound denoted by general formula (I) above, and nitrocellulose that has been wetted with any compound from among the group consisting of aromatic hydrocarbon compounds, ketone compounds, and ether compounds to form a carbon black coating material, adding a curing agent thereto, and coating the mixture.
4. A particulate magnetic recording medium having a nonmagnetic support, on one side of which is provided a magnetic layer, and on the other side of which is provided a backcoating layer, characterized in that the backcoating layer comprises microgranular carbon black with a mean primary particle diameter ranging from 5 to 30 nm and an inorganic powder with a mean particle diameter ranging from 10 to 250 nm and a Mohs' hardness ranging from 5 to 9, and in that the surface roughness Ra thereof ranges from 2.0 to 15 nm.
5. A magnetic recording medium in which the inorganic powder with a Mohs' hardness ranging from 5 to 9 of Aspect 4 is α-iron oxide or α-alumina.
6. A magnetic recording tape having a nonmagnetic support, on one side of which is provided a magnetic layer and on the other side of which is provided a backcoating layer, where the thickness of the backcoating layer ranges from 0.2 to 8.0 μm, the total thickness of the tape ranges from 3 to 10 μm, and the surface roughness Ra of the backcoating layer ranges from 2.0 to 15 nm.
7. A magnetic recording medium having a nonmagnetic support, on one side of which is provided a magnetic layer and on the other side of which is provided a backcoating layer, where an essentially nonmagnetic lower layer and a magnetic layer comprised of a ferromagnetic micropowder dispersed in binder are provided in this order on the nonmagnetic support, the coercivity of the magnetic layer is equal to or higher than $1.43 \times 10^5$ A/m (1,800 Oe), the product of the saturation magnetic flux density and the magnetic layer thickness of the magnetic layer ranges from 5 to 300 (mT·μm), and the surface roughness of the magnetic layer ranges from 1.0 to 3.0 nm as the center surface average surface roughness as measured by an optical interference roughness meter.
8. A magnetic recording medium where, in Aspects 1 to 4 above, the mean primary particle diameter of the microgranular carbon black ranges from 5 to 30 nm, the specific surface area ranges from 60 to 800 m²/g, the DBP oil absorption capacity ranges from 50 to 130 mL/100 g, the pH ranges from 2 to 11, and the volatile content is equal to or less than 15 weight percent.
9. A magnetic recording medium wherein, in Aspect 2 above, the mean primary particle diameter of the coarse granular carbon black ranges from 40 to 360 nm, the specific surface area ranges from 5 to 70 m²/g, the DBP oil absorption capacity ranges from 20 to 100 mL/100 g, and the pH ranges from 5 to 11.

The magnetic recording medium of the present invention is described in greater detail below.

The magnetic recording medium of the present invention comprises the compound denoted by general formula (I) below.

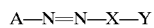

General formula (I)

In general formula (I) above, A denotes a compound capable of forming an azo dye with X—Y. Said A may be any compound capable of coupling with a diazonium compound to form an azo dye.

Specific examples of said A are given below, but the present invention is not limited in any way thereto.

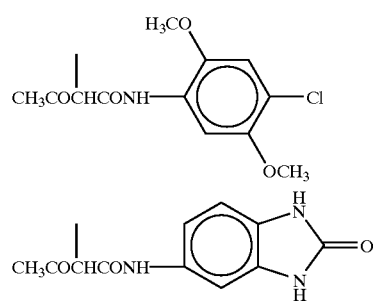

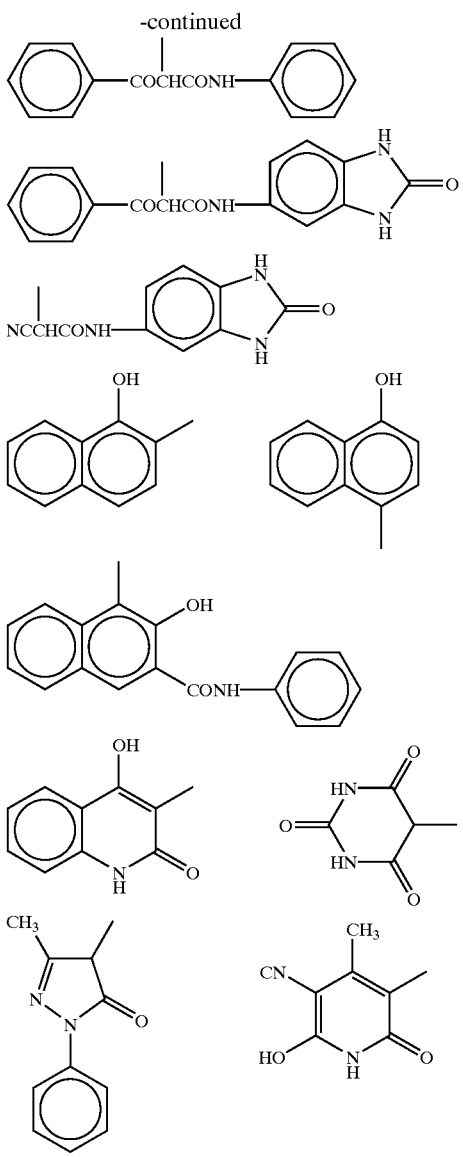

In general formula (I) above, X denotes a group selected from among divalent connecting groups denoted by the following structural formulas:

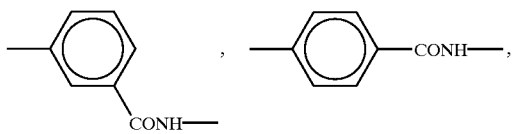

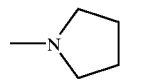 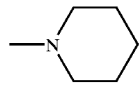

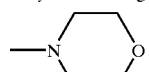

In general formula (I) above, Y denotes a group denoted by general formula (II):

General formula (II)

—⟨⟩—(CONH—Z—NR₂)$_a$

In general formula (II), Z denotes a lower alkylene group. Z may be represented by —(CH$_2$)$_b$—, wherein b denotes an integer ranging from 1 to 5, preferably 2 or 3.

In general formula (II), —NR$_2$ denotes a lower alkylamino group or a nitrogen-comprising five-membered or six-membered heterocyclic ring. When —NR$_2$ denotes a lower alkylamino group, it may be represented by —N(C$_n$H$_{2n+1}$)$_2$, where n denotes an integer ranging from 1 to 4, preferably 1 or 2. Additionally, when —NR$_2$ denotes a nitrogen-comprising five-membered or six-membered heterocyclic ring, the heterocyclic ring is preferably represented by one of the following structural formulas:

Pyrrolidine ring    Piperidine ring

Morpholine ring

In general formula (II) above, Z and —NR$_2$ are optionally substituted with a lower alkyl group or alkoxyl group.

In general formula (II) above, a denotes 1 or 2, preferably 2.

Specific examples of the compound denoted by general formula (I) above are given below, but the present invention is not limited in any way thereto.

1

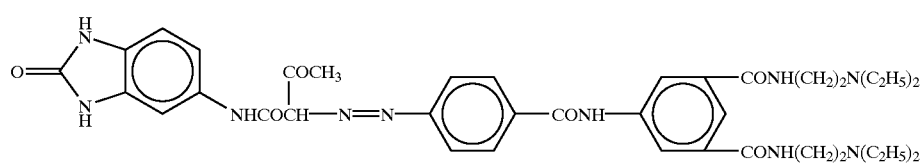

-continued
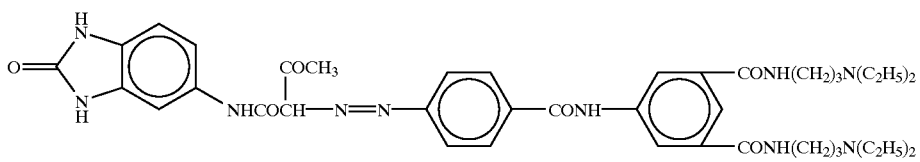
2
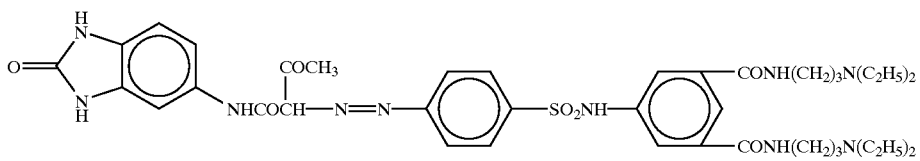
3
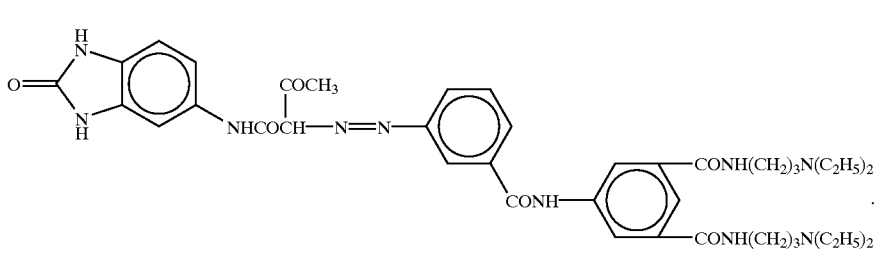
4
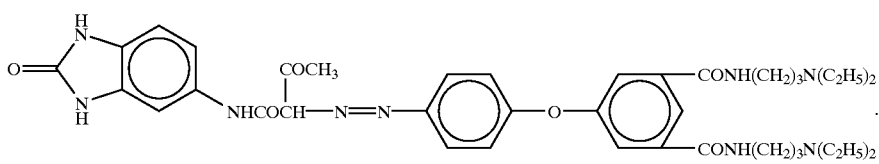
5
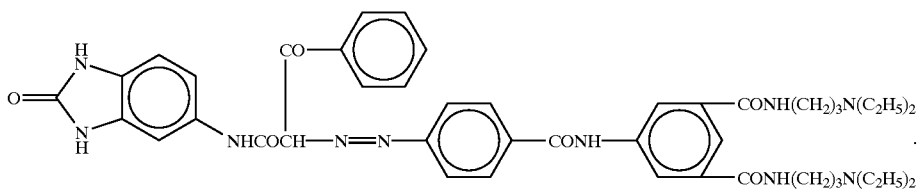
6
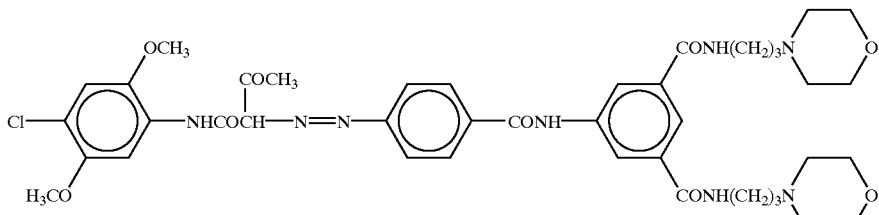
7
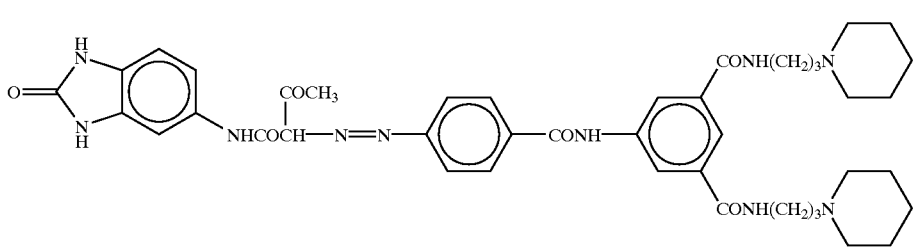
8

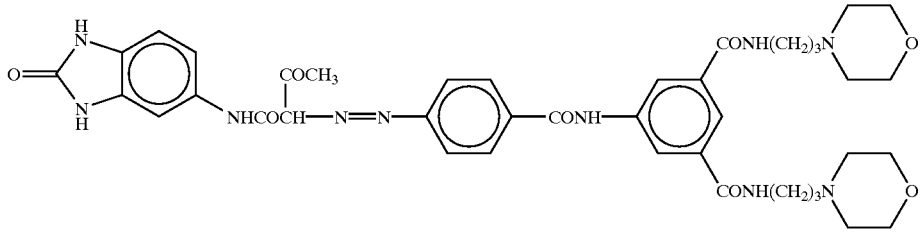

9

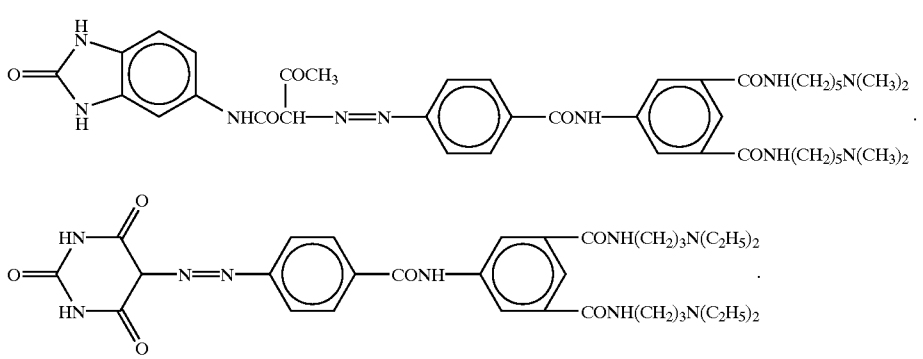

10

11

Synthesis examples of the compound denoted by general formula (I) above are given below.

SYNTHESIS EXAMPLE 1

Synthesis of Compound Example 2

(1) Fifty parts of dimethyl 5-nitroisophthalate and 130 parts of N,N-diethyl-1,3-propanediamine were reacted for about four hours at 80 to 100° C. under a slight vacuum. After confirming the disappearance of the starting material dimethyl 5-nitroisophthalate and monoamide compounds, the excess N,N-diethyl-1,3-propanediamine was removed under vacuum, yielding 92 parts of 5-nitroisophthalic acid bis-3-diethylaminopropylamide.

(2) 92 parts of the 5-nitroisophthalic acid bis-3-diethylaminopropylamide obtained, 112 parts of reduced iron, and 12 parts of ammonium chloride were refluxed in 200 parts of isopropanol and 35 parts of water and reduced, yielding 86 parts of 5-aminoisophthalic acid bis-3-diethylaminopropylamide.

(3) 18.5 parts of the 5-nitroisophthalic acid bis-3-diethylaminopropylamide obtained and 5.1 parts of triethylamine were dissolved in 60 parts of DMF and cooled with ice.

To this was added a solution comprising 9.3 parts of 4-nitrobenzoyl chloride in 60 parts of acetone, and amidation was conducted. Following the reaction, 800 parts of water were added, the crystals were recovered by filtration, and the crystals were recrystallized from ethyl acetate, yielding 14 parts of 4-nitrobenzoyl-4-[3,5-bis(3-diethylaminopropylcarbamoyl)]phenylamide.

(4) The compound obtained was reduced in the same manner as in (2) above, yielding 13.2 parts of aniline derivative.

(5) 13.2 parts of the aniline derivative obtained were added to 120 parts of methanol. With ice cooling, 18 parts of hydrochloric acid were then added. The mixed solution was then further cooled to −15° C.

To this was added dropwise an aqueous solution (20 parts water) of 1.8 parts of $NaNO_2$ to conduct diazotization (preparation of a diazo solution). A coupling component solution comprising 5.9 parts of 5-acetoacetylaminobenzimidazolone, 260 parts of methanol, 530 parts of water, and 10.8 parts of $NaCO_3$ was separately prepared and cooled to below 10° C. The diazo solution obtained above was then added dropwise without exceeding a temperature of 10° C. and the two were reacted. $K_2CO_3$ was added to render the system basic. The precipitating yellow product was recovered by filtration and recrystallized from DMF and acetonitrile, yielding 19 parts of above-recorded compound 2. The maximum absorption wavelength of the compound obtained was λ max 391 nm (in $CHCl_3$).

SYNTHESIS EXAMPLE 2

Synthesis of Compound 11

(1) A diazo solution comprising 180 parts of methanol, 31 parts of hydrochloric acid, 3.1 parts of $NaNO_2$, and 30 parts of water was prepared with 22.9 parts of aniline derivative in the same manner as in (5) of Synthesis Example 1.

(2) A coupling component solution comprising 5.6 parts of barbituric acid, 600 parts of methanol, 1,100 parts of water, and 19 parts of $Na_2CO_3$ was prepared. To this was added the diazo solution obtained in (1) and the two were reacted. Following the reaction, $K_2CO_3$ was added to render the system basic. The precipitating crystals were recovered by filtration and recrystallized from DMF and acetonitrile, yielding 16.3 parts of above-recorded compound 11. The maximum absorption wavelength of the compound obtained was λ max 378 nm (in $CHCl_3$).

The magnetic recording medium of the present invention has a layer comprising a granular substance. Examples of granular substances are metal oxides such as hematite, magnetite, maghemite, bertholide compounds, barium ferrite compounds, goethite, $TiO_2$, alumina, and boehmite; carbon black; metal and ferromagnetic metal powders; and Fe and FeCo alloys. The incorporation of carbon black is preferred to achieve an antistatic effect and running stability.

The above-described layer comprising a granular substance can be a magnetic layer, nonmagnetic layer, and/or backcoating layer; preferably, it is a backcoating layer provided on the reverse side of the nonmagnetic support from the surface on which the magnetic layer is provided. Providing a backcoating layer comprising a granular substance such as carbon black affords better running stability.

Preferably, the compound denoted above by general formula (I) above of the present invention is added in a quantity ranging from 0.1 to 50 parts by weight with respect to 100 parts by weight of the granular substance. When the amount added is within the stated range, good dispersion of the granular substance is achieved. The solvent employed in the step of manufacturing the granular dispersion layer of the present invention is not specifically limited, it being permissible to employ water, an organic solvent, or a mixed solution thereof.

It is possible to the granular substance is dispersed in a solvent containing the compound denoted by general formula (I) above, a granular substance dispersion coating material is prepared, and this coating material is coated, heated, and cured by the usual coating methods to provide a layer in which the granular substance is well dispersed.

To achieve a good dispersion, the granular substance is admixed during kneading of the compound denoted by general formula (I) above and the binder in an open kneader or the like, or during dispersion thereof using a roll mill or sand mill. Hot mixing of the compound of general formula (I) above and the binder in a melt state prior to dispersion is desirable not only to improve affinity between the basic groups of the compound of general formula (I) above and the binder, but also to improve quality and production properties because admixing of the granular substance is then uniform and rapid.

A binder such as nitrocellulose, dispersants, curing agents, lubricants, and the like may be incorporated into the above-described granular substance dispersion coating material. Specifically, the incorporation of nitrocellulose that has been wetted with any of the compounds in the group consisting of aromatic hydrocarbon compounds, ketone compounds, and ether compounds can yield better dispersion (above-described preferred Aspect 3).

When carbon black is incorporated into the backcoating layer, microgranular carbon black having a mean particle diameter ranging from 5 to 30 nm, for example, is preferred (above-described preferred Aspect 1). The type and manufacturing history of the carbon black are not specifically limited. Commercial oil furnace black, gas furnace black, channel black, and various other microgranular carbon blacks may be employed. Further, carbon black that has been subjected to a commonly conducted ozone treatment, plasma treatment, or liquid phase oxide treatment may also be employed.

The microgranular carbon black of particular preference has a mean particle diameter ranging from 5 to 30 nm, a specific surface area ranging from 60 to 800 $m^2$/g, a DBP oil absorption capacity ranging from 50 to 130 mL/100 g, a pH ranging from 2 to 11, and a volatile content equal to or less than 15 weight percent (above-described preferred Aspect 8).

Generally, the addition of microgranular carbon black makes it possible to impart low surface resistivity and low optical transmittance to the backcoating layer. Since the optical transmittance of the tape is often exploited by the magnetic recording device for use as an operation signal, in such a case, the addition of microgranular carbon black can be particularly effective. Generally, microgranular carbon black has good liquid lubricant retention ability and contributes to a reduction in the coefficient of friction. Additionally, coarse granular carbon black having a particle size ranging from 40 to 360 nm functions as a solid lubricant, forms minute protrusions on the surface of the backcoating layer, reduces the contact surface area, and contributes to a reduction in the coefficient of friction. However, in severe running systems, coarse granular carbon black has a drawback in that it tends to fall out of the backcoating layer due to rubbing of the tape, thus increasing the error rate. Accordingly, two types of carbon black of differing mean particle size are preferably combined for use as the carbon black that is added to the backcoating layer. In that case, microgranular carbon black having a mean particle size ranging from 5 to 30 nm and coarse granular carbon black having a mean particle size ranging from 40 to 360 nm are preferably combined for use (preferred Aspect 2). The mean particle diameter of the coarse granular carbon black is suited to range from 40 to 360 nm, preferably from 200 to 350 nm. More preferably, the mean particle diameter of the coarse granular carbon black above falls with the range of from 40 to 360 nm, the specific surface area thereof falls within the range of from 5 to 70 $m^2$/g, the DBP oil absorption capacity thereof falls within the range of from 20 to 100 mL/100 g, and the pH thereof falls within the range of from 5 to 11 (above-described preferred implementation mode 9).

When microgranular carbon black and coarse granular carbon black are employed in combination, the mass ratio thereof (microparticle/coarse particle) preferably ranges from 99/1 to 70/30, particularly from 99/1 to 80/20.

Specific products of microgranular carbon black that may be employed in the backcoating layer are given below. Numbers in parentheses denote mean particle diameters: RAVEN 2500 ULTRA (13 nm), RAVEN 5000 (8 nm), RAVEN 5000 ULTRA II (8 nm), RAVEN 5000 ULTRA III (8 nm), RAVEN 3500 (13 nm), RAVEN 5250 (16 nm), RAVEN 5750 (12 nm), RAVEN 1250 (20 nm), RAVEN 1200 (20 nm), RAVEN 2000 (18 nm), RAVEN 1500 (17 nm), RAVEN 1100 Ultra (27 nm), RAVEN 1170 (21 nm), RAVEN 1080 Ultra (28 nm), RAVEN 1060 Ultra (30 nm), RAVEN 1040 (24 nm), RAVEN 1020 (24 nm), RAVEN 890H (28 nm), Conductex 975 Ultra (21 nm), RAVEN 880 Ultra (30 nm), RAVEN 780 Ultra (29 nm), RAVEN 760 Ultra (30 nm), Conductex SC Ultra (20 nm), RAVEN C Ultra (20 nm) (the above products are manufactured by Columbia Carbon Co., Ltd.); MONARCH 800 (17 nm), BLACK PEARLS 800 (17 nm), MONARCH 880 (16 nm), BLACK PEARLS 880 (16 nm), MONARCH 900 (15 nm), BLACK PEARLS 900 (15 nm), MONARCH 1000 (16 nm), BLACK PEARLS 1000 (16 nm), MONARCH 1100 (14 nm), BLACK PEARLS 1100 (14 nm), MONARCH 1300 (13 nm), BLACK PEARLS 1300 (13 nm), MONARCH 1400 (13 nm), BLACK PEARLS 1400 (13 nm), VULCAN P (20 nm), BLACK PEARLS 480 (29 nm), MONARCH 460 (28 nm), BLACK PEARLS 460 (28 nm), BLACK PEARLS 430 (27 nm), REGAL 330R (25 nm), REGAL 330 (25 nm), REGAL 415R (25 nm), REGAL 415 (25 nm), VULCAN 9A32 (19 nm), REGAL 400R (25 nm), REGAL 400 (25 nm), REGAL 660R (24 nm), REGAL 660 (24 nm), MOGUL-L (24 nm), BLACK PEARLS-L (24 nm), REGAL 500R (25 nm) (the above products are manufactured by Cabot Corporation); PRINTEX 90 (14 nm), PRINTEX 95 (15 nm), PRINTEX 85 (16 nm), PRINTEX 75 (17 nm), Printex 55 (25 nm), Printex 45 (26 nm), Printex 40 (26 nm), Printex P (20 nm), Printex 60 (21 nm), Printex L6 (18 nm), Printex L (23 nm), Printex 300 (27 nm), Printex 30 (27 nm), Printex 3 (27 nm), Special Black 550 (25 nm) (the above products are manufactured by Degusa Co.); #3950, #950 (16 nm), #650B (22 nm), #2600 (13 nm), #2400 (15 nm), #2350 (15 nm), #2300 (15 nm), #2200 (18 nm), #1000 (18 nm), MA-600 (20 nm), #4000 (20 nm), #9180 (13 nm), #2700B (13 nm), #2650B (13) nm), #2450B (15 nm), #2400B (15 nm), #2200B (18 nm), #990 (16 nm), #980 (16 nm), #970 (16 nm), #960 (16 nm), #900 (16 nm), MCF88 (18 nm), #850 (17 nm), #750B (22 nm), #52 (27 nm), #50 (28 nm), #47 (23 nm), #45 (24 nm), #45L (24 nm), #44 (24 nm), #40 (24 nm), #33 (30 nm), #32 (30 nm), #30 (30 nm), MA77 (23 nm), MA7 (24 nm), MA8 (24 nm), MA11 (29 nm), MA100 (24 nm), MA100R (24 nm), MA100S (24 nm), MA230 (30 nm), MA200RB (30 nm) (manufactured by Mitsubishi Chemical Corporation).

Examples of specific products of coarse granular carbon black are Thermal Black (270 nm) (manufactured by Cancarb Limited.), RAVEN MTP (275 nm), Sevacarb MT-CI (350 nm), RAVEN 430 Ultra (82 nm), RAVEN 520 (60 nm), RAVEN 500 (53 nm), RAVEN 460 (67 nm), RAVEN 450 (75 nm), RAVEN 420 (86 nm), RAVEN 410 (101 nm), RAVEN H2O (55 nm) (manufactured by Columbia Carbon Co., Ltd.); BLACK PEARLS 130 (75 nm), REGAL 350R (48 nm), REGAL 350 (48 nm) (manufactured by Cabot Corporation); #25 (47 nm), #10 (75 nm), #5 (76 nm), CF9 (40 nm), #95 (40 nm), #260 (40 nm), #4010B (75 nm), MA14 (40 nm), and MA 220 (55 nm) (manufactured by Mitsubishi Chemical Corporation).

Further, inorganic powders with a Mohs' hardness of from 5 to 9 may be employed in combination with the above-listed microgranular carbon blacks (above-described preferred implementation mode 4). Two or more types of inorganic powder may be combined for use. Examples of preferred inorganic powders are α-iron oxide and α-alumina (above-described preferred implementation mode 5). The mass ratio in this case (microgranular carbon black/inorganic powder) preferably ranges from 99.5/0.5 to 70/30, particularly from 99/1 to 80/20.

Further, in addition to microgranular carbon black and inorganic powder, coarse granular carbon black may also be employed in combination. In that case, the mass ratio of the microgranular carbon black to the coarse granular carbon black preferably falls within the above-stated range, and the mass ratio (total carbon black/inorganic powder) preferably ranges from 99/1 to 70/30.

The surface roughness of the backcoating layer, in the form of the center surface average surface roughness Ra measured by optical interference roughness meter, preferably ranges from 2 to 15 nm, more preferably from 2 to 10 nm (above-described preferred Aspect 4).

When the magnetic tape is wound up, the surface of the backcoating layer is transferred to the surface of the magnetic layer, with the surface roughness affecting reproduction output and affecting the coefficient of friction to the guide poles. Thus, the surface roughness is desirably adjusted to within the above-stated range. Surface roughness Ra is normally adjusted by adjusting the material, surface properties, pressure, and the like of the calender rolls employed in the step of surface processing by calender following coating formation of the backcoating layer. In the present invention, the backcoating layer preferably ranges from 0.2 to 0.8 μm, more preferably from 0.2 to 0.7 μm, in thickness. In this case, the overall thickness of the tape preferably ranges from 3 to 10 μm, more preferably from 3 to 9.5 μm (preferred Aspect 6).

The magnetic layer employed in a magnetic recording medium having such a backcoating layer preferably has a surface recording density ranging from 0.3 to 3 Gbit/inch$^2$, more preferably from 0.5 to 3 Gbit/inch$^2$. Such a high surface recording density can also be achieved in magnetic recording media having single-layer magnetic layers, but are also effectively achieved in a magnetic recording medium having a configuration in which a magnetic layer is provided on a nonmagnetic lower layer. Although the magnetic layer may be in the form of a particulate medium comprising a ferromagnetic powder and binder, or in the form of a thin metal layer formed by a vacuum film forming method such as vapor deposition, a particulate medium is preferred from the viewpoint of production properties and the like, particularly when a lower layer is provided.

In magnetic recording media possessing both good durability and high density characteristics in the form of a surface recording density ranging from 0.3 to 3 Gbit/inch$^2$, or from 0.5 to 3 Gbit/inch$^2$, points such as those below may be organically linked: (1) high Hc and ultrasmoothness; (2) durability ensured by composite lubricating agents and improvements in high durability binders and ferromagnetic powders; (3) ultrathin magnetic layer and reduced variation in the interface with the lower layer; (4) high packing of ferromagnetic powder; (5) powders (ferromagnetic powder, nonmagnetic powder) with ultrafine microparticles; (6) head touch stabilization; (7) dimensional stabilization and servo tracking; (8) improvement in the thermal shrinkage rate of the magnetic layer and support; and (9) the effect of lubricants at high and low temperatures.

In the magnetic recording medium obtained based on the present invention, preferred is that the ultrathin magnetic layer comprises ultrafine granular magnetic powder with high output, good dispersion, and good durability, the lower layer comprises spherical, acicular, or similar inorganic powder, the use of a thin magnetic layer is desirable in that it reduces the effect of self-demagnetization in the magnetic layer, significantly increases output in the high frequency range, and improves overwrite characteristics. Improvement in the magnetic head further enhances the effect of the ultrathin magnetic layer when combined with a narrow-gap head and improves digital recording characteristics. The use of an MR element as the reproduction head is desirable in systems employing giant magnetic resistive elements.

To bring the magnetic layer thickness into conformity with high-density magnetic recording systems and the performance demanded of magnetic heads, a thin layer of from 0.04 to 0.3 μm is preferably selected. In an ultrathin magnetic layer that is both uniform and thin in this manner, the microgranular magnetic powder and nonmagnetic powder are dispersed to a high degree, thereby a high level of filling can be achieved. To achieve a maximum degree of the high-density region suitability, the magnetic powder employed preferably affords high output, high dispersability, and high orientation properties. That is, a ferromagnetic metal micropowder having extremely small particles that is capable of high output, particularly having a mean major axis length equal to or less than 0.12 μm, with the crystalline size of the ferromagnetic metal powder being from 8 to 18 nm, further incorporating a large quantity of Co and incorporating antisintering agents in the form of Al and Y compounds can yield high output and high durability. Since microgranular hexagonal ferrite has substantial high-density characteristics based on vertical magnetic anisotropy, its use in the present invention is desirable. The coercivity (Hc) of the magnetic layer of the magnetic recording medium of the present invention is preferably equal to or higher than 143 kA/m, more preferably equal to or higher than 159 kA/m, and even more preferably from 175 to 400 kA/m (above-described Aspect 7). The upper limit is not clearly established, and it is thought that the upper limit may increase with improvements in recording heads. The saturation magnetic flux density (Bs) of the magnetic layer preferably ranges from 180 to 650 mT. The product (Bs·δ) of the saturation magnetic flux density (Bs) of the magnetic layer and the thickness of the magnetic layer (δ) desirably falls within the range of from 5 to 300 (mT·μm) (above-described Aspect 7). The coercivity, thickness, and Bs·δ of the magnetic layer are desirably optimized for the head employed in the system. Designing for an optimal value of Bs·δ prevents the MR head from becoming saturated and output from decreasing.

In the magnetic recording medium of the present invention, the surface roughness of the magnetic layer, in the form of the center surface average surface roughness Ra as measured by optical interference roughness meter, preferably ranges from 1.0 to 3.0 nm, more preferably 2.7 nm or less, and still more preferably 2.5 nm or less (above-described preferred Aspect 7). At 3.0 nm or less, spacing loss between the magnetic recording medium and the head decreases and a high-output, low-noise magnetic recording medium can be obtained.

Durability is an important element in the magnetic recording medium. In particular, to achieve a high transfer rate, increasing the rotational speed of the magnetic head by at least five to ten times relative to that of a conventional recording system, and increasing the tape running speed by at least five to ten times in linear drive systems, are desirable. Ensuring the durability of the medium when magnetic head/cartridge internal parts and the medium slide against each other at high speed is an important problem. Means of increasing the durability of the medium include adjusting the binder formulation to increase the film strength of the medium itself and adjusting the lubricant formulation to maintain good sliding properties with the magnetic head. In preferred media obtained based on the present invention, a three-dimensional network binder system suited to ultrathin magnetic layers is employed to ensure the stability and durability of running during high-speed rotation. Further, effort is expended on the backcoating layer to achieve a high transfer rate.

Multiple lubricants producing good effects in use environments of various temperature and humidity are combined for use, with individual lubricants performing functions over a wide range of temperatures (high temperature, room temperature, low temperature) and humidity (high humidity, low humidity), so that overall, a stable lubricating effect is maintained.

A two-layer, upper and lower layer structure can be employed. The lubricant tank effect can be imparted to the lower layer so that a suitable amount of lubricant is constantly being supplied to the magnetic layer, thereby increasing the durability of the magnetic layer. The quantity of lubricant that can be contained in an ultrathin magnetic layer is limited. Simply thinning the magnetic layer reduces the absolute quantity of lubricant and leads to deterioration of running durability; thus, it is difficult to ensure durability. Imparting different functions to an upper and a lower layer so that they complement each other makes it possible to achieve both improved electromagnetic characteristics and durability. The division of functions is particularly effective in systems in which a magnetic head and a medium slide past each other at high speed.

In addition to the function of retaining lubricant, the lower layer can be imparted with the function of controlling surface resistivity. Generally, a solid electrically conductive material such as carbon black is often added to the magnetic layer to control resistivity. Not only does this limit the filling density of the magnetic material, but as the magnetic film becomes thinner, surface roughness is affected. Adding a conductive material to the lower layer can eliminate these drawbacks. The cushioning effect of the lower layer imparts good calender molding properties, head touch, and stable running.

As the capacity and density of magnetic recording increase, the recording track density increases. In the present invention, by employing a laser beam processing pattern provided on the magnetic recording medium surface for optical servo tracking, the traceability of the magnetic head to recording tracks can be ensured and the recording track density can be increased. In the magnetic recording medium obtained based on the present invention, a support with increased isotropic dimensional stability is employed to further stabilize traceability. The use of an ultrasmooth support permits an increase in magnetic layer smoothness.

With the development of a multimedia society, the need for image recording is becoming increasingly strong not just in the business world, but also in the home. The preferred high-capacity magnetic recording medium obtained based on the present invention has ample ability to respond to the functional and cost requirements of an image recording medium, as well as simple data such as text and numbers. The high-capacity medium obtained based on the present invention is based on particulate magnetic recording media, with their proven track records. It affords good long-term reliability and good cost performance. Only by combining various factors such as those set forth above through synergistic and organic operation can the preferred high-capacity magnetic recording medium obtained based on the present invention be achieved.

In the magnetic recording media of the present invention, the elements of particulate magnetic recording media will be described further.

Magnetic Layer

There are no particular restrictions on the magnetic recording medium other than that there be a structure having a magnetic layer on at least one surface of a support. Magnetic layers may be provided on both sides. Preferably, the magnetic layer is provided on a nonmagnetic lower layer (above-described preferred Aspect 7). For example, the magnetic layer can be provided by both wet-on-wet methods (W/W), where the lower layer and the magnetic layer are simultaneously applied on the support while still wet, or where following coating of the lower layer, the magnetic layer is provided while the lower layer is still wet in a sequential wet coating, and wet-on-dry methods (W/D), where the magnetic layer is provided after the lower layer has dried. (W/W) is preferred from the viewpoints of producing the thin magnetic layer and production yields. In (W/W), since the upper layer and lower layer are simultaneously formed in a multilayer structure, surface treatment steps such as calendering may be put to effective use to improve the surface roughness of even ultrathin magnetic layers.

Ferromagnetic Powder

The ferromagnetic powder employed in the magnetic layer is not specifically limited. However, ferromagnetic metal powders and hexagonal ferrite powders are preferred.

The ferromagnetic metal powder is preferably a ferromagnetic metal powder chiefly comprising α-iron. In addition to prescribed atoms, the following atoms can be contained in the ferromagnetic metal powder: Al, Si, Ca, Mg, P, Ti, Cr, Cu, Y, Sn, Sb, Ba, W, La, Ce, Pr, Nd, Co, Mn, Zn, Ni, Sr, B, and the like. Particularly, the incorporation of at least one of the following in addition to α-iron is desirable: Al, Ca, Mg, Y, Ba, La, Nd, Sm, Co, and Ni. Alloying Co with Fe is particularly desirable in that saturation magnetization increases and demagnetization improves. The content of Co relative to Fe preferably ranges from 1 to 40 atomic percent, more preferably from 15 to 35 atomic percent, and still more preferably from 20 to 35 atomic percent. The content of rare earth elements such as Y preferably ranges from 1.5 to 15 atomic percent, more preferably from 3 to 12 atomic percent, and still more preferably from 4 to 10 atomic percent. The content of Al preferably ranges from 1.5 to 12 atomic percent, more preferably from 3 to 10 atomic percent, and still more preferably from 4 to 9 atomic percent. Rare earth elements such as Y, and Al, function as antisintering agents; their use in combination yields a high antisintering effect. These ferromagnetic powders may be pretreated prior to dispersion with dispersing agents, lubricants, surfactants, antistatic agents, and the like, described further below. Specific examples are described in Japanese Examined Patent Publication (KOKOKU) Showa Nos. 44-14090, 45-18372, 47-22062, 47-22513, 46-28466, 46-38755, 47-4286, 47-12422, 47-17284, 47-18509, 47-18573, 39-10307, and 46-39639; and U.S. Pat. Nos. 3,026,215, 3,031,341, 3,100,194, 3,242,005, and 3,389,014.

The ferromagnetic metal powder may contain a small quantity of hydroxide or oxide. Ferromagnetic metal powders obtained by known manufacturing methods may be employed. The following are examples: methods employing a reducing gas such as hydrogen to reduce hydrous iron oxide or iron oxide that has been treated to prevent sintering, yielding Fe or Fe—Co particles or the like; methods of reduction with compound organic acid salts (chiefly oxalates) and reducing gases such as hydrogen; methods of thermal decomposition of metal carbonyl compounds; methods of reduction by addition of a reducing agent such as sodium boron hydride, hypophosphite, or hydrazine to an aqueous solution of ferromagnetic metal; and methods of obtaining micropowder by vaporizing a metal in a low-pressure inert gas. The ferromagnetic metal powders obtained in this manner are subjected to any of the known gradual oxidation treatments. The method in which hydrous iron oxide or iron oxide is reduced with a reducing gas such as hydrogen and partial pressure of oxygen-containing gas and inert gas, temperature and time are controlled to form an oxide film on the surface is preferred because of little demagnetization.

The specific surface area (referred to hereinafter as "$S_{BET}$") as measured by the BET method of the ferromagnetic powder ranges from 40 to 80 m$^2$/g, preferably from 45 to 70 m$^2$/g. At less than 40 m$^2$/g, noise sometimes increases, and at greater than 80 m$^2$/g, good surface properties become difficult to achieve. The crystalline size of the ferromagnetic metal powder of the magnetic layer of the present invention ranges from 8 to 18 nm, preferably from 10 to 17 nm, and still more preferably from 11 to 16.5 nm. The mean major axis length of the ferromagnetic powder preferably ranges from 10 to 250 nm, more preferably from 15 to 150 nm, and still more preferably from 20 to 120 nm. The acicular ratio of the ferromagnetic metal powder preferably ranges from 3 to 15, more preferably from 3 to 10. The saturation magnetization (σs) of the ferromagnetic metal powder preferably ranges from 90 to 170 A·m$^2$/kg, more preferably from 90 to 160 A·m$^2$/kg, and still more preferably from 100 to 160 A·m$^2$/kg. The coercive force of the ferromagnetic metal powder preferably ranges from 135 to 279 kA/m, preferably from 143 to 239 kA/m.

The moisture content of the ferromagnetic metal powder preferably ranges from 0.1 to 2 percent. The moisture content of the ferromagnetic powder is desirably optimized based on the type of binder employed. The pH of the ferromagnetic powder is desirably optimized based on the combination with the binder. The pH range ranges from 6 to 12, preferably from 7 to 11. The SA (stearic acid) adsorption capacity (a measure of the basicity of the surface) of the ferromagnetic metal powder ranges from 1 to 15 μmol/m$^2$, preferably from 2 to 10 μmol/m$^2$, and still more preferably from 3 to 8 μmol/m2. When a ferromagnetic metal powder with a high capacity of stearic acid adsorption is employed, it is desirable to modify the surface with organic matter strongly adsorbing to the surface to produce a magnetic recording medium. There are cases where soluble Na, Ca, Fe, Ni, Sr, NH$_4$, SO$_4$, Cl, NO$_2$, NO$_3$, and other inorganic ions are incorporated into the ferromagnetic metal powder. It is basically desirable that these not be present, but they do not affect characteristics so long as the total amount of each ion is about 300 ppm or less. Further, the ferromagnetic powder employed in the present invention desirably has few pores, with the quantity thereof preferably being equal to or less than 15 volume percent, more preferably equal to or less than 5 volume percent. The shape may be acicular, rice-particle shaped, or spindle-shaped so long as the above-stated mean particle size and magnetic characteristics are satisfied. A low SFD of the ferromagnetic powder itself is desirable, and the Hc distribution of the ferromagnetic powder is desirably narrowed. When the tape SFD is low, magnetization reversal is sharp and peak shifts are small, which is suited to high density digital magnetic recording. Methods of narrowing the Hc distribution include improving the particle size distribution of the goethite in the ferromagnetic metal powder, employing monodispersed α-Fe$_2$O$_3$, and preventing sintering between particles.

Ferromagnetic Hexagonal Ferrite Powder

Barium ferrite, strontium ferrite, lead ferrite, calcium ferrite, and various substitution products thereof, and Co substitution products or the like, can be employed as the hexagonal ferrite contained in the magnetic layer of the present invention. Specific examples are magnetoplumbite-type barium ferrite and strontium ferrite, magnetoplumbite-type ferrite, the particle surface of which is covered with spinels, and composite magnetoplumbite-type barium ferrite and strontium ferrite partly containing a spinel phase. The following may be incorporated in addition to other prescribed atoms: Al, Si, S, Nb, Sn, Ti, V, Cr, Cu, Y, Mo, Rh, Pd, Ag, Sn, Sb, Te, W, Re, Au, Bi, La, Ce, Pr, Nd, P, Co, Mn, Zn, Ni, B, Ge, Nb, and the like. Compounds to which elements such as Co—Zn, Co—Ti, Co—Ti—Zr, Co—Ti—Zn, Ni—Ti—Zn, Nb—Zn—Co, Sn—Zn—Co, Sn—Co—Ti, and Nb—Zn have been added may generally also be employed. Specific impurities are also sometimes incorporated based on the starting materials and manufacturing method. Of these, magnetoplumbite-type hexagonal ferrite is preferred because of its short wavelength output. The mean particle size, measured either as a disk diameter or a hexagonal plate diameter normally ranges from 10 to 50 nm, preferably from 10 to 45 nm, and more preferably from 10 to 40 nm.

Particularly when conducting reproduction with a magnetic resistance (MR) head to improve track density, a plate diameter equal to or less than 40 nm is desirable to reduce noise. However, a plate diameter equal to or less than 10 nm is undesirable because stable magnetization is difficult to achieve due to thermal fluctuation. At greater than 50 nm, noise increases. Neither of these cases is suited to high-density magnetic recording. A plate ratio (plate diameter/plate thickness) ranging from 1 to 15 is desirable, and from 1 to 7 is preferred. A low plate ratio is undesirable because packing in the magnetic layer increases, but making it difficult to achieve adequate orientation. Noise increases due to stacking between particles at a plate ratio of greater than 15. The $S_{BET}$ of the mean particle size normally ranges from 30 to 200 m²/g. The specific surface area is generally coded as an arithmetic value calculated from the particle plate diameter and the plate thickness. A narrower distribution of the particle plate diameter and plate thickness is usually preferred. To assign a number, comparison is possible by randomly measuring 500 particles in a TEM (transmission electron microscope) photograph of particles. Although the distribution is often not a normal distribution, when calculated and denoted as the standard deviation with respect to the mean particle size, it is given by σ/mean particle size=0.1 to 2.0. To achieve a sharp particle size distribution, the particle producing reaction system is rendered as uniform as possible and the particles produced may be subjected to a distribution-enhancing treatment. For example, one known method is the graded dissolution of ultrafine particles in an acid solution. In the vitrified crystal method, multiple rounds of heat treatment are performed, and nucleus production and growth are separated to achieve more uniform crystals. The coercivity Hc measured in the magnetic powder can be made about 40 to 400 kA/m. Although a high Hc is advantageous to high-density recording, this is limited by the capacity of the recording head. The Hc can be controlled through the particle size (plate diameter, plate thickness), type and quantity of elements contained, substitution site of elements, and the conditions under which the particle generating reaction is conducted. Saturation magnetization σ s ranges from 30 to 70 A·m²/kg. The σ s tends to decrease the smaller the particles become. Methods for manufacturing include reducing the crystallization temperature during manufacturing, reducing the temperature and/or duration of the heat treatment, increasing the quantity of compounds added, and increasing the level of surface treatment. It is also possible to use W-type hexagonal ferrite. The magnetic material particle surface is treated with a dispersion medium or substance suited to the polymer in the course of dispersing the magnetic material. An inorganic compound or organic compound is employed as the surface treatment agent. Representative examples such compounds include oxides or hydroxides of Si, Al, P, and Zr and the like as well as various silane coupling agents and titanium coupling agents. The quantity ranges from 0.1 to 10 percent with respect to the magnetic material. The pH of the magnetic material is also important to dispersion. A pH ranging from about 4 to 12 is usually optimal for the dispersion medium and polymer, but a pH ranging from about 6 to 11 is selected for the chemical stability and storage properties of the medium. Moisture contained in the magnetic material also affects dispersion. Although there is an optimal value for the dispersion medium and polymer, 0.1 to 2.0 mass percent is normally selected. Methods of manufacturing hexagonal ferrite include: (1) a vitrified crystallization method consisting of mixing into a desired ferrite composition barium carbonate, iron oxide, and a metal oxide substituting for iron with a glass forming substance such as boron oxide; melting the mixture; rapidly cooling the mixture to obtain an amorphous material; reheating the amorphous material; and refining and comminuting the product to obtain a barium ferrite crystal powder; (2) a hydrothermal reaction method consisting of neutralizing a barium ferrite composition metal salt solution with an alkali; removing the by-product; heating the liquid phase to 100° C. or greater; and washing, drying, and comminuting the product to obtain barium ferrite crystal powder; and (3) a coprecipitation method consisting of neutralizing a barium ferrite composition metal salt solution with an alkali; removing the by-product; drying the product and processing it at equal to or less than 1,100° C.; and comminuting the product to obtain barium ferrite crystal powder. However, any manufacturing method can be selected in the present invention.

The Lower Layer

The case where an essentially nonmagnetic lower layer (also referred to as the "nonmagnetic layer") is present between the support and the magnetic layer will be described next in detail. The nonmagnetic layer normally comprises an inorganic powder. Inorganic powders that may be selected for use are nonmagnetic powders, examples of which are: metal oxides, metal carbonates, metal nitrides, and metal carbides. Examples of inorganic compounds are α-alumina having an α-conversion rate equal to or higher than 90 percent, β-alumina, γ-alumina, θ-alumina, silicon carbide, chromium oxide, cerium oxide, α-iron oxide, goethite, silicon nitride, titanium dioxide, silicon dioxide, tin oxide, magnesium oxide, zirconium oxide, zinc oxide, and barium sulfate; these may be employed singly or in combination. Particularly desirable due to their narrow particle distribution and numerous means of imparting functions are titanium dioxide, zinc oxide, α-iron oxide, goethite, and barium sulfate. Even more preferred are titanium dioxide, α-iron oxide, and goethite. The α-iron oxide is preferably in the form of a magnetic iron oxide of uniform particle size or a metal-use starting material that is dehydrated by heating, annealed to reduce the number of pores, and surface treated when needed. Titanium dioxide normally has photocatalytic properties, generating radicals in the presence of light that run the risk of reacting with the binder and lubricants. Thus, a 1 to 10 percent solid solution of Al, Fe, or the like is desirably formed in the titanium dioxide employed in the present invention to reduce the photocatalytic characteristics. Further, the surface is desirably treated with an Al and/or Si compound to reduce the catalytic effect. The mean particle size of these nonmagnetic powders preferably ranges from 5 to 1,000 nm, but nonmagnetic powders of differing particle size may be combined as needed, or the particle diameter distribution of a single nonmagnetic powder may be broadened to achieve the same effect. What is preferred most is a mean particle size in the nonmagnetic powder ranging from 10 to 500 nm. Particularly when the nonmagnetic powder is a granular metal oxide, a mean particle diameter equal to or less than 80 nm is preferred, and when an acicular metal oxide, a mean major axis length equal to or less than 300 nm is preferred, with a particle size equal to or less than 200 nm being even more preferable. The tap density usually ranges from 0.3 to 1.5 g/mL, preferably from 0.4 to 1.3 g/mL. The moisture content of the nonmagnetic powder usually ranges from 0.2 to 5 mass percent, preferably from 0.3 to 3 weight percent, and still more preferably from 0.3 to 1.5 weight percent. The pH of the nonmagnetic power ranges from 2 to 12, with a pH range of from 5.5 to 11 being particularly desirable. The $S_{BET}$ of the nonmagnetic powder normally ranges from 1 to 150 m²/g, preferably from 10 to 100 m²/g, and still more preferably from 20 to 100 m²/g. The crystalline size of the nonmagnetic powder preferably ranges from 4 to 100 nm, more preferably from 4 to 80 nm. The dibutyl phthalate (DBP) oil absorption capacity usually ranges from 5 to 100 mL/100 g, preferably from 10 to 80 mL/100 g, and still more preferably from 20 to 60 mL/100 g. The specific gravity normally ranges from 1.5 to 7, preferably from 3 to 6. The shape may be any of acicular, spherical, polyhedral, or plate-shaped. The SA (stearic acid) absorption capacity of the nonmagnetic powder usually ranges from 1 to 20 $\mu$mol/m², preferably from 2 to 15 $\mu$mol/m², and more preferably from 3 to 8 $\mu$mol/m². When employing a nonmagnetic powder with a high capacity of stearic acid adsorption, it is desirable to modify the surface with an organic substance adsorbing strongly onto the surface to produce the magnetic recording medium. The surfaces of these nonmagnetic powders are preferably treated with compounds comprising elements such as Al, Mg, Si, Ti, Zr, Sn, Sb, Zn, and Y. Compounds that are particularly desirable as coating layers for their dispersion properties are $Al_2O_3$, $SiO_2$, $TiO_2$, $ZrO_2$, MgO, and hydrous oxides thereof. Even more preferable are $Al_2O_3$, $SiO_2$, $ZrO_2$, and hydrous oxides thereof. These may be employed singly or in combination. Depending on the objective, a surface-treated coating layer with a coprecipitated material may also be employed, the coating structure which comprises a first alumina coating and a second silica coating thereover or the reverse structure thereof may also be adopted. Depending on the objective, the surface-treated coating layer may be a porous layer, but homogeneity and density are generally desirable.

Specific examples of nonmagnetic powders suitable for use in the nonmagnetic layer of the magnetic recording medium of the present invention are: Nanotite from Showa Denko K. K.; HIT-100 and HIT-80 from Sumitomo Chemical Co., Ltd.; α-iron oxide DPN 250BX, DPN-245, DPN-270BX, DPN-550BX, DPN-550RX, DBN-450BX, DBN-650RX, and DAN-850RX from Toda Kogyo Corp.; titanium oxide TTO-51B, TTO-55A, TTO-55B, TTO-55C, TTO-55S, TTO-55D, and SN-100 from Ishihara Sangyo Co., Ltd.; titanium oxide STT-4D, STT-30D, STT-30, STT-65C, and α-iron oxide α-40 from Titan Kogyo K. K.; titanium oxide MT-100S, MT-100T, MT-150W, MT-500B, MT-600B, MT-100F, and MT-500HD from Tayca Corporation; FINEX-25, BF-1, BF-10, BF-20, and ST-M from Sakai Chemical Industry Co., Ltd.; iron oxide DEFIC-Y and DEFIC-R from Dowa Mining Co., Ltd.; AS2BM and TiO2P25 from Nippon Aerogil; 100A and 500A from Ube Industries, Ltd.; and sintered products of the same.

Mixing carbon black into the lower layer achieves the known effects of lowering surface resistivity Rs and reducing light transmittance, as well as yielding the desired micro Vickers hardness. Further, the incorporation of carbon black into the nonmagnetic layer can also serve to store lubricants. In that case, the compound of general formula (I) above may be incorporated into the nonmagnetic layer. Even when carbon black is not incorporated, the nonmagnetic layer may comprise a compound having general formula (I) above. Examples of types of carbon black that are suitable for use are furnace black for rubber, thermal for rubber, black for coloring, electrically conductive carbon black, and acetylene black. Based on the effect desired, the following characteristics can be optimized in the carbon black in the nonmagnetic layer, and effects can be achieved by using different carbon blacks in combination.

The $S_{BET}$ of the carbon black in the nonmagnetic layer normally ranges from 50 to 500 m²/g, preferably from 70 to 400 m²/g. The DBP oil absorption capacity normally ranges from 20 to 400 mL/100 g, preferably from 30 to 400 mL/100 g. The mean particle diameter of the carbon black normally ranges from 5 to 80 nm, preferably from 10 to 50 nm, and more preferably from 10 to 40 nm. Preferably, the pH of the carbon black ranges from 2 to 10, the moisture content ranges from 0.1 to 10 percent, and the tap density ranges from 0.1 to 1 g/mL. Specific examples of types of carbon black suitable for use in the present invention are: BLACK PEARLS 2000, 1400, 1300, 1100, 1000, 900, 800, 880, 700, MONARCH 800, 880, 900, 1000, 1100, 1300, 1400, and VULCAN XC-72 from Cabot Corporation; #9180, #3050B, #3150B, #3750B, #3950B, #2600, #2400, #2350, #2300, #2200, #1000, #950, #650B, #970B, #850B, MA-600, MA-230 #4000, and #4010 from Mitsubishi Chemical Corporation; CONDUCTEX SC, RAVEN 8800, 8000, 7000, 5750, 5250, 3500, 2100, 2000, 1800, 1500, 1255, 1250, 2500 ULTRA, 5000, 5000 ULTRA II, 5000 ULTRA III, and 1200 from Columbia Carbon Co., Ltd.; and Ketjen Black EC from Lion Akzo Co., Ltd. The carbon black employed can be surface treated with a dispersing agent or the like, grafted with a resin, or a portion of the surface may be graphite-treated. Further, the carbon black may be dispersed with a binder prior to being added to the coating material. These types of carbon black are employed in a range that does not exceed 50 mass percent with respect to the inorganic powder above and does not exceed 40 percent with respect to the total mass of the nonmagnetic layer. These types of carbon black may be employed singly or in combination. The *Carbon Black Handbook* compiled by the Carbon Black Association may be consulted for types of carbon black suitable for use in the present invention.

Based on the objective, an organic powder may be added to the nonmagnetic layer. Examples are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed. The manufacturing methods described in Japanese-Unexamined Patent Publication (KOKAI) Showa Nos. 62-18564 and 60-255827 may be employed.

As regards the binder resin (type and quantity); quantity and type of lubricants, dispersants, and additives; solvents; and dispersion methods of the nonmagnetic layer, the techniques known with regard to magnetic layers may be applied.

The Binder

Conventionally known thermoplastic resins, thermosetting resins, reactive resins and mixtures thereof may be employed as binders to form the magnetic layer, and if desired, the nonmagnetic layer and backcoating layer of the present invention. The thermoplastic resins have a glass transition temperature of from −100 to 150° C., normally have a number average molecular weight of from 1,000 to 200,000, preferably from 10,000 to 100,000, and have a degree of polymerization of about from 50 to 1,000. Examples are polymers and copolymers comprising structural units in the form of vinyl chloride, vinyl acetate, vinyl alcohol, maleic acid, acrylic acid, acrylic acid esters, vinylidene chloride, acrylonitrile, methacrylic acid, methacrylic acid esters, styrene, butadiene, ethylene, vinyl butyral, vinyl acetal, and vinyl ether; polyurethane resins; and various rubber resins.

Further, examples of thermosetting resins and reactive resins are phenol resins, epoxy resins, polyurethane cured resins, urea resins, melanine resins, alkyd resins, acrylic reactive resins, formaldehyde resins, silicone resins, epoxy polyamide resins, mixtures of polyester resins and isocyanate prepolymers, mixtures of polyester polyols and polyisocyanates, and mixtures of polyurethane and polyisocyanates. These resins are described in detail in the *Handbook of Plastics* published by Asakura Shoten. It is also possible to employ known electron beam-cured resins in individual layers. Examples thereof and methods of manufacturing the same are described in detail in Japanese Unexamined Patent Publication (KOKAI) Showa No. 62-256219. The above-listed resins may be used singly or in combination. Preferred resins are combinations of polyurethane resin and at least one member selected from the group consisting of vinyl chloride resin, vinyl chloride—vinyl acetate copolymers, vinyl chloride—vinyl acetate—vinyl alcohol copolymers, and vinyl chloride—vinyl acetate—maleic anhydride copolymers, as well as combinations of the same with polyisocyanate.

Known structures of polyurethane resin can be employed, such as polyester polyurethane, polyether polyurethane, polyether polyester polyurethane, polycarbonate polyurethane, polyester polycarbonate polyurethane, and polycaprolactone polyurethane.

Of these, polyurethane resin comprising diol components in the form of a short-chain diol with a molecular weight of less than 500 having a cyclic structure and a long-chain polyetherdiol having a molecular weight of from 500 to 5,000 are preferred.

The short-chain diol having a molecular weight of less than 500 and a cyclic structure (referred to hereinafter simply as "short-chain diol") is preferably selected from among aromatic and aliphatic diols, and ethylene oxide or propylene oxide adducts thereof and the like.

Examples of short-chain diols are bisphenol A, bisphenol A hydride, bisphenol S, bisphenol S hydride, bisphenol P, bisphenol P hydride, cyclohexanedimethanol, cyclohexanediol, and hydroquinone. Of these, bisphenol A, bisphenol A hydride, and ethylene oxide adducts and propylene oxide adducts of the same are preferred. Of even greater preference is bisphenol A hydride. The content of the short-chain diol in the polyurethane resin preferably ranges from 15 to 40 mass percent.

Preferred examples of long-chain polyether diols having a molecular weight ranging from 500 to 5,000 (referred to hereinafter simply as "long-chain diols") are propylene oxide adducts of bisphenol A, ethylene oxide adducts of bisphenol A, ethylene oxide adducts of bisphenol A hydride, and propylene oxide adducts of bisphenol A hydride.

Polyurethane comprising polyisocyanate and dimer-diol obtained by converting into a dimeric acid in the form of an unsaturated aliphatic carboxylic acid with 18 carbon atoms, adding hydrogen to reduce the unsaturated bond and the carboxylic acid, and refining the product by distillation is preferred.

To obtain better dispersability and durability in all of the binders set forth above, it is desirable to introduce by copolymerization or addition reaction one or more polar groups selected from among —COOM, —$SO_3M$, —$OSO_3M$, —P=O(OM)$_2$, —O—P=O(OM)$_2$, (where M denotes a hydrogen atom or an alkali metal), OH, $NR_2$, $N^+R_3$ (where R denotes a hydrocarbon group), epoxy groups, SH, and CN. The quantity of the polar group is from $10^{-1}$ to $10^{-8}$ mol/g, preferably from $10^{-2}$ to $10^{-6}$ mol/g.

Specific examples of the binders employed in the present invention are VAGH, VYHH, VMCH, VAGF, VAGD, VROH, VYES, VYNC, VMCC, XYHL, XYSG, PKHH, PKHJ, PKHC, and PKFE from Union Carbide Corporation; MPR-TA, MPR-TA5, MPR-TAL, MPR-TSN, MPR-TMF, MPR-TS, MPR-TM, and MPR-TAO from Nisshin Kagaku Kogyo K. K.; 1000W, DX80, DX81, DX82, DX83, and 100FD from Denki Kagaku Kogyo K. K.; MR-104, MR-105, MR110, MR100, MR555, and 400X-110A from Nippon Zeon Co., Ltd.; Nippollan N2301, N2302, and N2304 from Nippon Polyurethane Co., Ltd.; Pandex T-5105, T-R3080, T-5201, Burnock D-400, D-210-80, Crisvon 6109, and 7209 from Dainippon Ink and Chemicals Incorporated.; Vylon UR8200, UR8300, UR-8700, RV530, and RV280 from Toyobo Co., Ltd.; Daipheramine 4020, 5020, 5100, 5300, 9020, 9022, and 7020 from Dainichiseika Color & Chemicals Mfg. Co., Ltd.; MX5004 from Mitsubishi Chemical Corporation; Sanprene SP-150 from Sanyo Chemical Industries, Ltd.; and Saran F310 and F210 from Asahi Chemical Industry Co., Ltd.

The binder employed in the nonmagnetic layer and magnetic layer of the magnetic recording medium obtained based on the present invention is employed in a range of from 5 to 50 mass percent, preferably from 10 to 30 mass percent with respect to the nonmagnetic powder in the nonmagnetic layer and the magnetic powder in the magnetic layer. Vinyl chloride resin, polyurethane resin, and polyisocyanate are preferably combined within the ranges of: 5 to 30 mass percent for vinyl chloride resin, when employed; 2 to 20 mass percent for polyurethane resin, when employed; and 2 to 20 mass percent for polyisocyanate. However, when a small amount of dechlorination causes head corrosion, for example, it is also possible to employ polyurethane alone, or employ polyurethane and isocyanate alone. In the present invention, when polyurethane is employed, a glass transition temperature of from −50 to 150° C., preferably from 0 to 100° C., an elongation at break of from 100 to 2,000 percent, a stress at break of from 0.05 to 10 kg/mm² (0.49 to 98 MPa), and a yield point of from 0.05 to 10 kg/mm² (0.49 to 98 MPa) are desirable.

The magnetic recording medium according to the present invention comprises at least two layers. Accordingly, the quantity of binder; the quantity of vinyl chloride resin, polyurethane resin, polyisocyanate, or some other resin in the binder; the molecular weight of each of the resins forming the magnetic layer; the quantity of polar groups; or the physical characteristics or the like of the above-described resins can naturally be different in each of the layers as required. These are optimized in each layer. Known techniques may be applied for a multilayered magnetic layer. For example, when the quantity of binder is different in each layer, increasing the quantity of binder in the magnetic layer effectively decreases scratching on the surface of the magnetic layer. To achieve good head touch, the quantity of binder in the nonmagnetic layer can be increased to impart flexibility.

Examples of polyisocyanates suitable for use in the magnetic layer, nonmagnetic layer, and backcoating layer of the present invention are tolylene diisocyanate, 4,4'-diphenylmethane diisocyanate, hexamethylene diisocyanate, xylylene diisocyanate, napthylene-1,5-diisocyanate, o-toluidine diisocyanate, isophorone diisocyanate, triphenylmethane triisocyanate, and other isocyanates; products of these isocyanates and polyalcohols; polyisocyanates produced by condensation of isocyanates; and the like. These isocyanates are commercially available under the following trade names, for example: Coronate L, Coronate HL, Coronate 2030, Coronate 2031, Millionate MR and Millionate MTL manufactured by Nippon Polyurethane Industry Co. Ltd.; Takenate D-102, Takenate D-110N, Takenate D-200 and Takenate D-202 manufactured by Takeda Chemical Industries Co., Ltd.; and Desmodule L, Desmodule IL, Desmodule N and Desmodule HL manufactured by Sumitomo Bayer Co., Ltd. They can be used singly or in combinations of two or more in all layers by exploiting differences in curing reactivity.

Carbon Black

Carbon black may be incorporated into the magnetic layer; in that case, the compounds of general formula (I) above may be employed in the magnetic layer. However, even when carbon black is not employed, the compound of general formula (I) above may still be incorporated into the magnetic layer. Examples of types of carbon black that are suitable for use are: furnace black for rubber, thermal for rubber, black for coloring, electrically conductive carbon black, and acetylene black. A specific surface area of from 5 to 500 $m^2/g$, a DBP oil absorption capacity of from 10 to 400 mL/100 g, a mean particle diameter of from 5 to 300 nm, a pH of from 2 to 10, a moisture content of from 0.1 to 10 mass percent, and a tap density of from 0.1 to 1 g/mL are desirable. Specific examples of types of carbon black employed in the present invention are: BLACK PEARLS 2000, 1300, 1000, 900, 880, 800, 700 and VULCAN XC-72 from Cabot Corporation; #80, #60, #55, #50 and #35 manufactured by Asahi Carbon Co., Ltd.; #2400B, #2300, #900, #1000, #30, #40 and #10B from Mitsubishi Chemical Corporation; CONDUCTEX SC, RAVEN 150, 50, 40, 15 and RAVEN MT-P from Columbia Carbon Co., Ltd.; and Ketjen Black EC from Lion Akzo Co., Ltd. The carbon black employed may be surface-treated with a dispersant or grafted with resin, or have a partially graphite-treated surface. The carbon black may be dispersed in advance into the binder prior to addition to the magnetic coating material. These carbon blacks may be used singly or in combination. When employing carbon black, the quantity preferably ranges from 0.1 to 30 mass percent with respect to the magnetic material. In the magnetic layer, carbon black works to prevent static, reduce the coefficient of friction, impart light-blocking properties, enhance film strength, and the like; the properties vary with the type of carbon black employed. Accordingly, the type, quantity, and combination of carbon blacks employed in the present invention may be determined separately for the upper magnetic layer and the lower nonmagnetic layer based on the objective and the various characteristics stated above, such as particle size, oil absorption capacity, electrical conductivity, and pH, and be optimized for each layer. For example, the *Carbon Black Handbook* compiled by the Carbon Black Association may be consulted for types of carbon black suitable for use in the magnetic layer of the magnetic recording medium of the present invention.

Abrasives

Known materials, chiefly with a Mohs' hardness equal to or higher than 6, such as α-alumina having an α-conversion rate equal to or higher than 90 percent, β-alumina, microgranular diamond, silicon carbide, chromium oxide, cerium oxide, α-iron oxide, corundum, silicon nitride, titanium carbide, titanium oxide, silicon dioxide, and boron nitride, may be used singly or in combination as abrasives in the magnetic layer of the magnetic recording medium of the present invention. Further, a composite comprising two or more of these abrasives (an abrasive obtained by surface-treating one abrasive with another) may also be used. Although these abrasives may contain compounds and elements other than the main component or element in some cases, there is no change in effect so long as the main component constitutes equal to or higher than 90 mass percent. The mean particle size of these abrasives preferably ranges from 10 to 1,000 nm, a narrow particle size distribution being particularly desirable for improving electromagnetic characteristics. As needed to improve durability, abrasives of differing particle size may be combined or the same effect may be achieved by broadening the particle diameter distribution even with a single abrasive. A tap density of from 0.3 to 1.5 g/mL, a moisture content of from 0.1 to 5 mass percent, a pH of from 2 to 11, and a specific surface area of from 1 to 40 $m^2/g$ are desirable. The abrasive employed in the present invention may be any of acicular, spherical, or cubic in shape, but shapes that are partially angular have good abrasion properties and are thus preferred. Specific examples: AKP-10, AKP-15, AKP-20, AKP-30, AKP-50, HIT-20, HIT-30, HIT-50, HIT-50G, HIT-60A, HIT-60G, HIT-70, HIT-80, HIT-82, and HIT-100 from Sumitomo Chemical Co., Ltd.; ERC-DBM, HP-DBM, and HPS-DBM from Reynolds Co.; WA10000 from Fujimi Abrasives Co.; UB20 from Kamimura Kogyo Co., Ltd.; G-5, Chromex U2, and Chromex U1 from Nippon Chemical Industrial Co., Ltd.; TF100 and TF-140 from Toda Kogyo Corp.; Beta Random Ultrafine from Ibidene Co.; and B-3 from Showa Mining Co., Ltd. As needed, these abrasives may be added to the nonmagnetic layer. Addition to the nonmagnetic layer permits control of surface shape and control of the manner in which the abrasive protrudes. The particle diameter and quantity of abrasive added to the magnetic layer and nonmagnetic layer are optimally established, as a matter of course. An effective manufacturing method is to separately disperse the abrasives, and then add them to the magnetic layer or nonmagnetic layer coating material.

Additives

Substances having lubricating effects, antistatic effects, dispersive effects, plasticizing effects, or the like may be employed as additives in the magnetic layer and nonmagnetic layer of the magnetic recording medium according to the present invention. The following are suitable for use: molybdenum disulfide; tungsten disulfide; graphite; boron nitride; graphite fluoride; silicone oils; silicones having a polar group; fatty acid-modified silicones; fluorine-containing silicones; fluorine-containing alcohols; fluorine-containing esters; polyolefins; polyglycols; alkylphosphoric esters and their alkali metal salts; alkylsulfuric esters and their alkali metal salts; polyphenyl ethers; phenylphosphonic acid; α-naphthylphosphoric acid; phenylphosphoric acid; diphenylphosphoric acid; p-ethylbenzenephosphonic acid; phenylphosphinic acid; aminoquinones; various silane coupling agents and titanium coupling agents; fluorine-containing alkyl sulfuric acid esters and their alkali metal salts; monobasic fatty acids (which may contain an unsaturated bond or be branched) having 10 to 24 carbon atoms and metal salts (such as Li, Na, K, and Cu) thereof; monohydric, dihydric, trihydric, tetrahydric, pentahydric or hexahydric alcohols with 12 to 22 carbon atoms (which may contain an unsaturated bond or be branched); alkoxy alcohols with 12 to 22 carbon atoms (which may contain an unsaturated bond or be branched); monofatty esters, difatty esters, or trifatty esters comprising a monobasic fatty acid having 10 to 24 carbon atoms (which may contain an unsaturated bond or be branched) and any one from among a monohydric, dihydric, trihydric, tetrahydric, pentahydric or hexahydric alcohol having 2 to 12 carbon atoms (which may contain an unsaturated bond or be branched); fatty acid esters of monoalkyl ethers of alkylene oxide polymers; fatty acid amides with 8 to 22 carbon atoms; and aliphatic amines with 8 to 22 carbon atoms.

Specific examples of these fatty acids are: capric acid, caprylic acid, lauric acid, myristic acid, palmitic acid, stearic acid, behenic acid, oleic acid, elaidic acid, linolic acid, linolenic acid, and isostearic acid. Examples of fatty acid esters are butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentylglycol didecanoate, and ethylene glycol dioleyl. Examples of alcohols are oleyl alcohol, stearyl alcohol, and lauryl alcohol. It is also possible to employ nonionic surfactants such as alkylene oxide-based surfactants, glycerin-based surfactants, glycidol-based surfactants and alkylphenolethylene oxide adducts; cationic surfactants such as cyclic amines, ester amides, quaternary ammonium salts, hydantoin derivatives, heterocycles, phosphoniums, and sulfoniums; anionic surfactants comprising acid groups, such as carboxylic acid, sulfonic acid, phosphoric acid, sulfuric ester groups, and phosphoric ester groups; and ampholytic surfactants such as amino acids, amino sulfonic acids, sulfuric or phosphoric esters of amino alcohols, and alkyl betaines. Details of these surfactants are described in *A Guide to Surfactants* (published by Sangyo Tosho K. K.). These lubricants, antistatic agents and the like need not be 100 percent pure and may contain impurities, such as isomers, unreacted material, by-products, decomposition products, and oxides in addition to the main components. These impurities preferably comprise equal to or less than 30 mass percent, and more preferably equal to or less than 10 mass percent.

The lubricants and surfactants employed in the present invention each have different physical effects. The type, quantity, and combination ratio of lubricants producing synergistic effects are optimally set for a given objective. It is conceivable to control bleeding onto the surface through the use of fatty acids having different melting points in the nonmagnetic layer and the magnetic layer; to control bleeding onto the surface through the use of esters having different boiling points, melting points, and polarity; to improve the stability of coatings by adjusting the quantity of surfactant; and to increase the lubricating effect by increasing the amount of lubricant in the nonmagnetic layer. The present invention is not limited to these examples. Generally, a total quantity of lubricant ranging from 0.1 to 50 mass percent, preferably from 2 to 25 mass percent with respect to the magnetic material or nonmagnetic powder is selected.

All or some of the additives used in the present invention may be added at any stage in the process of manufacturing the magnetic layer and nonmagnetic layer coating liquids. For example, they may be mixed with the magnetic material before a kneading step; added during a step of kneading the magnetic material, the binder, and the solvent; added during a dispersing step; added after dispersing; or added immediately before coating. Part or all of the additives may be applied by simultaneous or sequential coating after the magnetic layer has been applied to achieve a specific purpose. Depending on the objective, the lubricant may be coated on the surface of the magnetic layer after calendering or making slits.

Known organic solvents may be employed in the present invention. For example, the solvents described in Japanese Unexamined Patent Publication (KOKAI) Showa No. 6-68453 may be employed.

The Layer Structure

In the thickness structure of the magnetic recording medium according to the present invention, in the case of a magnetic tape, the support is 2.5 to 20 $\mu$m in thickness, and to increase the volume density, 2.5 to 10 $\mu$m, preferably 2.5 to 8 $\mu$m. In the case of a flexible magnetic disk, the support is 20 to 100 $\mu$m in thickness, preferably 20 to 75 $\mu$m.

An undercoating layer may be provided to improve adhesion between the support and the nonmagnetic layer or magnetic layer. The thickness of the undercoating layer ranges from 0.01 to 0.5 $\mu$m, preferably from 0.02 to 0.5 $\mu$m. Known undercoating layers may be employed.

The thickness of the magnetic layer of the medium according to the present invention is optimized based on the saturation magnetization level of the head, the head gap length, and the recording signal band. A thickness of from 0.04 to 0.3 $\mu$m, preferably from 0.04 to 0.25 $\mu$m is generally suitable. It is also possible to separate the magnetic layer into two or more layers having different magnetic characteristics. Known multiple magnetic layer structures may be employed. When two or more magnetic layers are provided, the "thickness of the magnetic layer" refers to the thickness of the uppermost layer.

The thickness of the nonmagnetic layer on which the magnetic layer is provided ranges from 0.2 to 5.0 $\mu$m, preferably from 0.3 to 3.0 $\mu$m, and still more preferably from 0.5 to 2.5 $\mu$m. The nonmagnetic layer performs its function so long as it is essentially nonmagnetic. For example, the presence or intentional incorporation of a small quantity of impurity is permissible. The term "essentially nonmagnetic" means that the nonmagnetic layer exhibits a residual magnetic flux density equal to or less than 50 mT or a coercive force equal to or less than 40 percent than that of the magnetic layer, preferably exhibiting no residual magnetic flux density or coercive force at all.

The Backcoating Layer

Generally, in magnetic tapes for computer data recording, greater repeat running properties are demanded than is the case for video tapes and audio tapes. To maintain such high running durability, a backcoating layer is desirably provided on the opposite side from the magnetic layer in the present invention. The backcoating layer functions to prevent static and compensate for curling.

The backcoating layer preferably comprises carbon black and the above-described compound of general formula (I) dispersed in a binder described below. However, the addition of other optional components in the form of dispersing agents and lubricants is desirable. Examples of dispersing agents are: fatty acids having 12 to 18 carbon atoms (RCOOH, R denoting an alkenyl group or an alkyl group having 11 to 17 carbon atoms) such as caprylic acid, capric acid, lauric acid, myristic acid, palmitic acid, stearic acid, behenic acid, oleic acid, elaidic acid, linolic acid, linolenic acid, and stearolic acid; metallic soaps of the above-listed fatty acids with alkali metals or alkaline earth metals; fluorine-containing compounds of the above-listed fatty acid esters; amides of the above-listed fatty acids; polyalkyleneoxide alkylphosphoric acid ester; lecithin; trialkylpolyolefinoxy quaternary ammonium salts (the alkyls having 1 to 5 carbon atoms and the olefin being ethylene, propylene, or the like); sulfuric acid esters; and copper phthalocyanine derivatives other than the compound of above-recorded general formula (I). These may be employed singly or in combination. Of these, copper oleate, copper phthalocyanine derivatives other than the above-recorded compound of general formula (I), and barium sulfate are preferred. The dispersant is added within a range of from 0.5 to 20 mass parts per 100 mass parts of the binder resin.

The lubricant employed may be selected from among the lubricants that are commonly employed in conventional magnetic tapes. However, in the present invention, fatty acids having equal to or higher than 18 carbon atoms, or fatty acid esters, are preferred from the viewpoint of improving running properties. The lubricant is normally added in a proportion of from 1 to 5 mass parts per 100 mass parts of binder resin.

Examples of binders used to form the backcoating layer of the present invention are thermoplastic resins, thermosetting resins, reactive resins, and mixtures thereof. Examples of thermoplastic resins are: polyvinyl chloride resin, polyurethane resin, phenoxy resin, vinyl chloride—vinyl acetate copolymers, vinyl chloride—vinylidene chloride copolymers, vinyl chloride—acrylonitrile copolymers, acrylic acid ester—acrylonitrile copolymers, acrylic acid ester—vinylidene chloride copolymers, acrylic acid ester—styrene copolymers, methacrylic acid ester—acrylonitrile copolymers, methacrylic acid ester—vinylidene chloride copolymers, methacrylic acid ester—styrene copolymers, polyvinyl fluoride, vinylidene chloride—acrylonitrile copolymers, butadiene—acrylonitrile copolymers, polyamide resins, polyvinyl butyral, cellulose resins (cellulose acetate butyrate, cellulose diacetate, cellulose propionate, nitrocellulose, and the like), styrene—butadiene copolymers, polyester resins, chlorovinyl ether—acrylic acid ester copolymers, amino resins, and various rubber resins. Examples of thermosetting resins and reactive resins are: phenol resins, epoxy resins, polyurethane cured resins, urea resins, melamine resins, alkyd resins, acrylic reactive resins, formaldehyde resins, silicone resins, epoxy-polyamide resins, and polyisocyanates.

The Support

Known films of the following may be employed as the support in the present invention: polyesters such as polyethylene terephthalate, polyethylene naphthalate, polyolefins, cellulose triacetate, polycarbonate, polyamides comprising aromatic polyamides such as aramides, polyimides, polyamidoimides, polysulfones, and polybenzooxazole. A support having a glass transition temperature equal to or higher than 100° C., particularly from 120 to 400° C., is preferred. The use of high-strength support such as polyethylene naphthalate (PEN), polyamides is particularly desirable. As needed, stacked supports such as are disclosed in Japanese Unexamined Patent Publication (KOKAI) Heisei No. 3-224127 may be employed to vary the surface roughness of the magnetic surface and support surface. These supports may be subjected beforehand to corona discharge treatment, plasma treatment, adhesion enhancing treatment, heat treatment, dust removal, and the like.

To achieve the object of the present invention, the use of a support with a center surface average surface roughness (SRa) as measured by optical interference roughness meter equal to or less than 8.0 nm, preferably equal to or less than 4.0 nm, and still more preferably equal to or less than 2.0 nm, is desirable. It is desirable that the support simply has not only a low center surface average surface roughness, but also no coarse protrusions of 0.5 $\mu$m or above. The shape of the roughness of the surface may be controlled as needed through the size and quantity of filler that is added to the support. Examples of these fillers are oxides and carbonates of Ca, Si, Ti and the like; and acrylic-based organic powders. Preferably, the maximum height of the support, $SR_{max}$, is equal to or less than 1 $\mu$m; the ten-point average roughness $SR_z$ is equal to or less than 0.5 $\mu$m; the center surface peak height $SR_p$ is equal to or less than 0.5 $\mu$m, the center surface valley depth $SR_v$ is equal to or less than 0.5 $\mu$m, the center surface area percentage $SS_r$ is equal to or higher than 10 percent and equal to or less than 90 percent, and the average wavelength $S\lambda$ a is equal to or higher than 5 $\mu$m and equal to or less than 300 $\mu$m. The surface protrusion distribution of the support may be controlled at will with filler to achieve desired electromagnetic characteristics and durability. The number of each surface protrusion ranging from 0.01 $\mu$m to 1 $\mu$m in size per 0.1 mm$^2$ may be controlled to within a range of from 0 to 2,000.

The F-5 value of the support employed in the present invention preferably ranges from 5 to 50 kg/mm$^2$ (49 to 490 MPa) and the thermal shrinkage rate of the support after 30 minutes at 100° C. is preferably equal to or less than 3 percent, more preferably equal to or less than 1.5 percent. The thermal shrinkage rate after 30 min at 80° C. is equal to or less than 1 percent, preferably equal to or less than 0.5 percent. A breaking strength of 5 to 100 kg/mm$^2$ (49 to 980 MPa) and a modulus of elasticity of from 100 to 2,000 kg/mm$^2$ (980 to 19600 MPa) are preferred. The coefficient of thermal expansion is from $10^{-4}$ to $10^{-8}$/°C., preferably from $10^{-5}$ to $10^{-6}$/°C. The coefficient of moisture expansion is equal to or less than $10^{-4}$/RH percent, preferably equal to or less than $10^{-5}$/RH percent. These thermal characteristics, dimensional characteristics, and mechanical strength characteristics are preferably nearly equal, differing by 10 percent or less, in any in-plane direction of the support.

Manufacturing Method

The process for manufacturing the magnetic coating material and the nonmagnetic coating material of the magnetic recording medium according to the present invention comprises at least a kneading step, a dispersing step, and a mixing step to be carried out, if necessary, before and/or after the kneading and dispersing steps. Each of the individual steps may be divided into two or more stages. All of the starting materials employed in the present invention, including the magnetic material, nonmagnetic powder, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion. To achieve the object of the present invention, conventionally known manufacturing techniques may be utilized for some of the steps. A kneader having a strong kneading force, such as an open kneader, continuous kneader, pressure kneader, or extruder is preferably employed in the kneading step. When a kneader is employed, the magnetic material or nonmagnetic powder and all or part of the binder (preferably equal to or higher than 30 mass percent of the entire quantity of binder) are kneaded in a range of from 15 to 500 parts per 100 parts of magnetic material. Details of the kneading process are described in Japanese Unexamined Patent Publication (KOKAI) Heisei Nos. 1-106338 and 1-79274. The nonmagnetic layer coating material may also be adjusted based on the quantity of magnetic coating material. Further, glass beads may be employed to disperse the magnetic coating material and nonmagnetic coating material, with a dispersing medium with a high specific gravity such as zirconia beads, titania beads, and steel beads being suitable for use. The particle diameter and fill ratio of these dispersing media are optimized for use. A known dispersing device may be employed. Magnetic material, abrasives, and carbon black having different dispersion rates may first be separately dispersed, admixed, and then microdispersed if needed, to obtain coating solutions.

Methods such as the following are desirably employed when coating a multilayer structure magnetic recording medium in the present invention. In the first method, the nonmagnetic layer is first applied with a coating device commonly employed to apply magnetic coating materials such as a gravure coating, roll coating, blade coating, or extrusion coating device, and the upper layer is applied while the nonmagnetic layer is still wet by means of a support pressure extrusion coating device such as is disclosed in Japanese Examined Patent Publication (KOKOKU) Heisei No. 1-46186 and Japanese Unexamined Patent Publication (KOKAI) Showa No. 60-238179 and Japanese Unexamined Patent Publication (KOKAI) Heisei No. 2-265672. In the second method, the upper and lower layers are applied nearly simultaneously by a single coating head having two built-in slits for passing coating solution, such as is disclosed in Japanese Unexamined Patent Publication (KOKAI) Showa No. 63-88080, Japanese Unexamined Patent Publication (KOKAI) Heisei No. 2-17971, and Japanese Unexamined Patent Publication (KOKAI) Heisei No. 2-265672. In the third method, the upper and lower layers are applied nearly simultaneously using an extrusion coating apparatus with a backup roller as disclosed in Japanese Unexamined Patent Publication (KOKAI) Heisei No. 2-174965. To avoid compromising the electromagnetic characteristics or the like of the magnetic recording medium by aggregation of magnetic particles, shear is desirably imparted to the coating liquid in the coating head by a method such as disclosed in Japanese Unexamined Patent Publication (KOKAI) Showa No. 62-95174 or Japanese Unexamined Patent Publication (KOKAI) Heisei No. 1-236968. In addition, the viscosity of the coating liquid must satisfy the numerical range specified in Japanese Unexamined Patent Publication (KOKAI) Heisei No. 3-8471. Applying the nonmagnetic layer, drying it, and then applying the magnetic layer thereover in a sequential multilayer coating to achieve the structure of the magnetic recording medium of the present invention is also possible, and does not compromise the effect of the present invention. However, to reduce the number of voids in the coating and improve the quality as regards dropout and the like, the above-describe simultaneous multilayer coating is preferred.

Processing with calender processing rollers in the form of heat-resistant plastic rollers of epoxy, polyimide, polyamide, polyimidoamide or the like, or metal rollers, is desirable. The processing temperature is preferably equal to or higher than 50° C., more preferably equal to or higher than 100° C. Linear pressure is desirably equal to or higher than 200 kg/cm (196 kN/m), more preferably equal to or higher than 300 kg/cm (294 kN/m).

It is preferable that the coefficient of friction of the magnetic recording medium of the present invention relative to the head is equal to or less than 0.5 and preferably equal to or less than 0.3 at temperatures ranging from −10° to 40° C. and humidity ranging from 0 percent to 95 percent, the specific surface resistivity desirably ranges from $10^4$ to $10^{12}$ Ω/sq on the magnetic surface, and the charge potential preferably ranges from −500 V to +500 V. The modulus of elasticity at 0.5 percent extension of the magnetic layer desirably ranges from 100 to 2,000 kg/mm² (980 to 1,960 MPa) in each in-plane direction. The breaking strength desirably ranges from 10 to 70 kg/mm² (98 to 686 MPa). The modulus of elasticity of the magnetic recording medium desirably ranges from 100 to 1,500 kg/mm² (980 to 14,700 MPa) in each in-plane direction. The residual elongation is desirably equal to or less than 0.5 percent, and the thermal shrinkage rate at all temperatures below 100° C. is preferably equal to or less than 1 percent, more preferably equal to or less than 0.5 percent, and most preferably equal to or less than 0.1 percent. The glass transition temperature of the magnetic layer (i.e., the temperature at which the loss elastic modulus of dynamic viscoelasticity peaks as measured at 110 Hz) of the magnetic layer is preferably equal to or higher than 50° C. and equal to or less than 120° C., and that of the lower nonmagnetic layer preferably ranges from 0 to 100° C. The loss elastic modulus preferably falls within a range of from $1 \times 10^7$ to $8 \times 10^8$ N/m² and the loss tangent is preferably equal to or less than 0.2. Adhesion failure tends to occur when the loss tangent becomes excessively large. These thermal characteristics and mechanical characteristics are desirably nearly identical, varying by 10 percent or less, in each in-plane direction of the medium. The residual solvent in the magnetic layer is preferably equal to or less than 100 mg/m² and more preferably equal to or less than 10 mg/m². The void ratio in the coated layers, including both the nonmagnetic layer and the magnetic layer, is preferably equal to or less than 30 volume percent, more preferably equal to or less than 20 volume percent. Although a low void ratio is preferable for attaining high output, there are some cases in which it is better to ensure a certain level based on the object.

The surface roughness of the magnetic layer surface, in the form of the center surface average surface roughness Ra as measured by optical interference roughness meter, preferably ranges from 1.0 to 3.0 nm, more preferably equal to or less than 2.8 nm, and still more preferably equal to or less than 2.5 nm (above-described preferred implementation mode 7). Preferably, the maximum height of the magnetic layer, $R_{max}$, is equal to or less than 0.5 μm; the ten-point average roughness $R_z$ is equal to or less than 0.3 μm; the center surface peak height $R_p$ is equal to or less than 0.3 μm, the center surface valley depth $R_v$ is equal to or less than 0.3 μm, the center surface area percentage $S_r$ ranges from 20 to equal to or less than 80 percent, and the average wavelength λa ranges from 5 to equal to or less than 300 μm. The number of surface protrusions in the magnetic layer measuring from 0.01 μm to 1 μm in size is preferably set to within a range of from 0 to 2,000, thereby electromagnetic characteristics and the coefficient of friction are preferably optimized. These can be easily controlled by varying surface properties with fillers in the support, as well as by the particle diameter and quantity of powders added to the magnetic layer, the surface shape of the rollers employed in calendaring and the like. Curling is preferably within ±3 mm.

When there is both a nonmagnetic layer and a magnetic layer in the magnetic recording medium according to the present invention, it will be readily understood that the physical characteristics of the nonmagnetic layer and the magnetic layer can be varied based on the objective. For example, the magnetic layer can be imparted with a high modulus of elasticity to improve running durability while at the same time imparting to the nonmagnetic layer a lower modulus of elasticity than that of the magnetic layer to improve head contact with the magnetic recording medium.

Embodiments

Specific embodiments of the present invention are described below; however, the present invention is not limited thereto. Unless specifically stated otherwise, "parts" refer to "mass parts".

TABLE 1

|  | Type of Carbon Black | | | Backcoating Layer Compound | |
| --- | --- | --- | --- | --- | --- |
|  | Microgranular Carbon Black | Coarse Granular Carbon Black | Inorganic Powder | Type | Amount Added Relative to Carbon Black (wt %) |
| Embodiment 1 | MONARCH 800 | Thermax MT | None | Compound 2 | 4 |
| Embodiment 2 | MONARCH 800 | Thermax MT | None | Compound 2 | 10 |
| Embodiment 3 | MONARCH 800 | Thermax MT | None | Compound 9 | 4 |
| Embodiment 4 | MONARCH 800 | None | None | Compound 2 | 4 |
| Embodiment 5 | MONARCH 800 | Thermax MT | Hematite | Compound 2 | 4 |
| Embodiment 6 | MONARCH 800 | Thermax MT | Alumina | Compound 2 | 4 |
| Embodiment 7 | RAVEN 2500 ULTRA | Thermax MT | None | Compound 2 | 4 |
| Embodiment 8 | RAVEN 2500 ULTRA | Thermax MT | Alumina | Compound 2 | 4 |
| Comp. Ex. 1 | MONARCH 800 | Thermax MT | None | None | — |
| Comp. Ex. 2 | MONARCH 800 | Thermax MT | None | Phthalocyanine compound (1) | 4 |

The physical characteristics of the carbon black employed were as follows.

(1) MONARCH 800 (from Cabot Cooporation):

| Mean particle diameter | 17 nm |
| --- | --- |
| Specific surface area | 210 m$^2$/g |
| DBP oil absorption capacity | 68 cc/100 g |
| pH | 9.0 |
| Volatile content | 1.5 weight percent |

(2) RAVEN 2500 ULTRA (from Columbia Carbon Co., Ltd.)

| Mean particle diameter | 13 nm |
| --- | --- |
| Specific surface area | 270 m$^2$/g |
| DBP oil absorption capacity | 65 cc/100 g |
| pH | 5.7 |
| Volatile content | 1.2 weight percent |

(3) Thermax MT:

| Mean particle diameter | 270 nm |
| --- | --- |
| Specific surface area | 8–11 m$^2$/g |
| DBP oil absorption capacity | 30–40 cc/100 g |
| pH | 9.0–11.0 |
| Volatile content | 0.3 weight percent or less |

Embodiment 1
Magnetic Coating Material 1
  Ferromagnetic metal powder 100 parts
    Co/Fe=30 atomic %, Al/Fe=8 atomic %, Y/Fe=6 atomic %
    Hc: 1.87×10$^5$ A/m (2,350 Oe)
    Specific surface area: 55 m$^2$g
    σs: 140 A·m$^2$/kg (140 emu/g)
    Crystalline size: 140 Å
    Major axis length: 0.068 μm
    Acicular ratio: 6
    Surface oxide film thickness: 25 Å

| Vinyl chloride polymer MR 110 (from Nippon Zeon Co., Ltd.) | 12 parts |
| --- | --- |
| Polyurethane resin A | 4 parts |
| α-Alumina (mean particle diameter 0.15 μm) | 5 parts |
| Carbon black (mean particle diameter 40 nm) | 5 parts |
| Phenylphosphonic acid | 3 parts |
| Butyl stearate | 5 parts |
| Stearic acid | 6 parts |
| Methyl ethyl ketone | 180 parts |
| Cyclohexanone | 180 parts |

Nonmagnetic Coating Material
  Nonmagnetic powder α-Fe$_2$O$_3$ 80 parts
    Major axis length: 0.12 μm
    Specific surface area by BET method: 50 m$^2$/g
    pH: 9
    Surface treatment agent: Alumina compound (1 weight percent as Al$_2$O$_3$)

| α-Alumina (mean particle diameter 0.15 μm) | 5 parts |
| --- | --- |
| Carbon black (Mitsubishi Chemical Corporation, #950, mean primary particle diameter 16 nm) | 20 parts |
| Vinyl chloride polymer MR110 (from Nippon Zeon Co., Ltd.) | 12 parts |
| Polyurethane resin A | 5 parts |
| Phenylphosphonic acid | 2 parts |
| Butyl stearate | 6 parts |
| Stearic acid | 5 parts |
| Methyl ethyl ketone/cyclohexanone (7.3 mixed solution | 250 parts |

The above-listed polyurethane resin A was synthesized as follows.

A reflux condenser and a stirrer were procured; bisphenol A hydride, a propylene oxide adduct of bisphenol A (molecular weight 700), polypropylene glycol (molecular weight 400), and bis(2-hydroxyethyl)sulfoisophthalate sodium salt were added in a molar ratio of 24:14:10:2 to a 50:50 mass ratio of cyclohexanone and dimethyl acetamide in a vessel that had been backfilled ahead of time with nitrogen; and the compounds were dissolved at 60° C. under a nitrogen gas flow. Di-n-dibutyltin dilaurate was added as a catalyst in a proportion of 60 ppm with respect to the total quantity of starting materials employed. MDI (4,4'-diphenylmethanediisocyanate) was added in a quantity equimolar with the total sum of diol, the mixture was reacted with heating for 6 hr at 90° C., and polyurethane resin A comprising 4.0 mmol/g of ether groups, incorporating $8 \times 10^{-5}$ equivalent/g of $SO_3Na$, with an Mw of 45,000 and an Mn of 25,000 was obtained.

Backcoating Layer Formation Coating Liquid Composition (1)

| | |
|---|---|
| Microgranular carbon black powder MONARCH 800 from Cabot Corporation, mean particle diameter: 17 nm) | 100 parts |
| Coarse granular powder (Thermal Black from Cancarb Limited, mean particle diameter: 270 nm) | 5 parts |
| Alcohol-free nitrocellulose (from Asahi Kasei Corporation, Sernova BTH1/2) | 157 parts |
| Polyurethane resin | 26 parts |
| Polyisocyanate resin | 26 parts |
| Polyester resin | 4 parts |
| Backcoating layer compound (see Table 1) | 4 parts |
| Methyl ethyl ketone | 1,300 parts |
| Toluene | 700 parts |

With regard to the above-mentioned magnetic layer coating material, the pigment, polyvinyl chloride, phenylphosphonic acid, and 50 percent of each of the solvents in the formula were kneaded, the polyurethane and the remaining components were added, and the mixture was dispersed with a sand grinder. To the dispersion obtained were added 14 parts of polyisocyanate and 30 parts of cyclohexanone, and the mixture was passed through a filter having a 1 μm mean pore diameter to prepare the respective magnetic layer formation coating liquids.

With regard to the nonmagnetic layer coating material, the metal oxides, carbon black, polyvinyl chloride, phenylphosphonic acid, and 50 percent of each of the solvents in the formula were kneaded in a kneader, the polyurethane resin and the remainder of each of the solvents were added, and the mixture was dispersed in a sand grinder to obtain the nonmagnetic layer dispersion.

The dispersion obtained was stirred with a disperser and dispersed with a sand grinder. To the dispersion obtained, in the case of the nonmagnetic layer coating liquid, 15 parts of polyisocyanate were added, after which 30 parts of cyclohexanone were added. The dispersion was then passed through a filter with a mean pore diameter of 1 μm to complete preparation of the nonmagnetic layer formation coating liquid.

Method of Dispersing Carbon Black in the Backcoating Layer and Method of Preparing Backcoating Layer Coating Liquid With regard to the backcoating layer coating material, the full quantity of microgranular carbon black, 95 percent of the backcoating layer compound and of the Sernova BTH1/2 called for in the formula, and 47.5 percent of each of the solvents called for in the formula were admixed, stirred in a disperser, and dispersed with zirconia beads (1 mm in diameter) in a sand grinder. Next, 38 percent of the polyurethane resin called for in the formula was added, the mixture was stirred in a disperser, and the mixture was dispersed for 2 hr with zirconia beads (1 mm in diameter) in a sand grinder.

The full quantity of coarse granular carbon black, 5 percent of the backcoating layer compounds and Sernova BTH1/2 called for in the formula, and 2.5 percent of each of the solvents called for in the formula were admixed, stirred in a disperser, and dispersed for 6 hr with zirconia beads (1 mm in diameter) in a sand grinder. Next, 4 percent of the polyurethane resin called for in the formula was added, the mixture was stirred in a disperser, and the mixture was dispersed for 2 hr with zirconia beads (1 mm in diameter) in a sand grinder, yielding backcoating layer dispersion a.

The above-mentioned backcoating layer dispersion a was stirred in a disperser, dispersed for 30 min in a sand grinder, the remainder of the polyurethane resin, polyester resin, curing agent, and individual solvents were added, and the mixture was stirred with a disperser to obtain backcoating layer dispersion b.

The backcoating layer dispersion b obtained was stirred in a disperser and the dispersion was passed through a filter with a 1 μm mean pore size to complete preparation of the backcoating layer forming coating liquid.

Simultaneous multilayer coating was conducted on an aramide base having a thickness of 5.5 μm and a center surface average surface roughness of 2 nm by coating the nonmagnetic layer forming coating liquid in a quantity yielding a dry thickness of the lower layer of 1.7 μm and immediately applying magnetic coating material 1 thereover in a quantity yielding a magnetic layer 0.20 μm in thickness. While the two layers were both still wet, they were oriented with a cobalt samarium magnet having a magnetic force of $4.8 \times 10^5$ A/m (6,000 Oe) and a solenoid having a magnetic force of $4.8 \times 10^5$ A/m (6,000 Oe) and dried. Subsequently, backcoating layer forming coating liquid (1) was applied to a thickness of 0.4 μm. A seven-stage calender comprising only metal rollers was then used to heat treat the product at a temperature of 95° C. at rate of 150 m/min. Next, slits 3.8 mm in width were formed in the resulting coated product, the magnetic layer was subjected to a surface abrasion treatment, and the coated product was wound into a DDS cartridge to obtain a sample (magnetic tape). The magnetic characteristics of the magnetic layer obtained and the Ra of the magnetic layer and backcoating layer were measured. The 4.7 MHz reproduction output, C/N ratio, coefficient of friction at 23° C. and 60 percent, guide pole grime, and head grime were measured.

Embodiment 2

With the exception that the quantity of backcoating layer compounds added was changed to 10 wt percent, a magnetic tape was produced in the same manner as in Embodiment 1.

Embodiment 3

With the exception that the backcoating layer compounds were changed to the types shown in Table 1, a magnetic tape was produced in the same manner as in Embodiment 1.

Embodiment 4

With the exception that no coarse granular carbon was added to the backcoating layer, a magnetic tape was produced in the same manner as in Embodiment 1.

Embodiments 5 and 6

With the exception that the types of inorganic powder indicated in Table 1 were added and backcoating layer dispersion c below was employed, a magnetic tape was prepared in the same manner as in Embodiment 1.

The full quantity of inorganic powder (hematite or alumina), 5 percent of the polyurethane resin called for in the formula, and 10 percent of each of the solvents called for in the formula were added, stirred in a disperser, and dispersed for 3 hr with zirconia beads (1 mm in diameter) in a sand grinder.

Backcoating layer dispersion a was stirred in a disperser and dispersed in a sand grinder for 30 min, after which the remainder of the polyurethane resin, the polyester resin, the curing agent, and the remainder of each of the solvents were stirred in a disperser to obtain backcoating layer dispersion c.

The following inorganic powders were selected for use.

| | |
|---|---|
| Hematite (TF100 from Toda Kogyo Corp., mean particle diameter: 110 nm, Mohs'hardness: 9) | 15 parts |
| α-Alumina | 15 parts |

Embodiments 7 and 8

With the exception that the microgranular carbon black indicated in Table 1 was employed in Embodiment 7, a magnetic tape was produced in the same manner as in Embodiment 1. With the exception that the microgranular carbon black shown in Table 1 was employed and alumina was employed as the inorganic powder in Embodiment 8, a magnetic tape was produced in the same manner as in Embodiment 1.

Comparative Example 1

With the exception that no backcoating layer compound was added, a magnetic tape was produced in the same manner as in Embodiment 1.

Comparative Example 2

With the exception that the phthalocyanine compound (1) described in Japanese Examined Patent Publication (KOKOKU) Heisei No. 7-31801 was employed as the backcoating compound, a magnetic tape was produced in the same manner as in Embodiment 1.

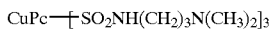

$CuPc\text{---}[SO_2NH(CH_2)_3N(CH_3)_2]_3$

Evaluation Methods (1) Center surface average surface roughness (Ra):

Surface roughness as measured by optical interference roughness meter (Ra): Using a TOPO3D from WYKO Co., Ra, Rams, Peak-Valley value of a surface area of about 250×250 μm were measured with an optical interference roughness meter. Spherical surface correction and cylindrical correction were subjected at a measurement wavelength of about 650 nm. The optical interference roughness meter employed was a non-contact surface roughness meter that measured by optical interference.

(2) First pass coefficient of friction (μ value) and 500$^{th}$ pass coefficient of friction (μ value) of backcoating layer surface: The tape was passed at an angle of 180 degrees over an SUS420J with a diameter of 4 mm, slid at a rate of 18 mm/sec and a load of 10 g, and the friction of coefficient was calculated by Euhler's equation.

$\mu = (1/\pi)\ln(T2/10)$ $T2$ is the slide resistance value (g)

The measurement was conducted through the 500$^{th}$ pass. The coefficient of friction $\mu1$ of the first pass and the coefficient of friction $\mu500$ of the 500$^{th}$ pass were calculated.

(3) Guide pole grime: The grime on the guide poles touching to the back surface was evaluated after running the cartridge five times on a DDS drive.

The grime on the guide poles was visually observed, wiped with tissue, and functionally evaluated. The larger the number, the more grime there was in a five-level evaluation. Five was the level with the most grime on a scale of from 1 to 5.

TABLE 2

| | Backcoating Layer Characteristics | | | Backcoating Layer Coefficients of Friction | | |
|---|---|---|---|---|---|---|
| | Luster | Surface Roughness (nm) | Surface Resistivity (Ω/sq) | First pass | 500$^{th}$ pass | Guide Grime |
| Embodiment 1 | 126 | 6.0 | $3 \times 10^5$ | 0.25 | 0.27 | 1 |
| Embodiment 2 | 135 | 5.6 | $1 \times 10^5$ | 0.25 | 0.26 | 1 |
| Embodiment 3 | 122 | 6.1 | $3 \times 10^5$ | 0.25 | 0.26 | 1 |
| Embodiment 4 | 126 | 5.9 | $4 \times 10^5$ | 0.25 | 0.26 | 1 |
| Embodiment 5 | 125 | 5.8 | $3 \times 10^5$ | 0.25 | 0.26 | 2 |
| Embodiment 6 | 125 | 5.8 | $3 \times 10^5$ | 0.24 | 0.26 | 1 |
| Embodiment 7 | 124 | 5.9 | $4 \times 10^5$ | 0.24 | 0.25 | 1 |
| Embodiment 8 | 124 | 5.9 | $4 \times 10^5$ | 0.26 | 0.27 | 1 |
| Comp. Ex. 1 | 5 | Not measurable | $8 \times 10^4$ | 0.25 | 0.28 | 4 |
| Comp. Ex. 2 | 90 | 13.3 | $3 \times 10^5$ | 0.25 | 0.28 | 3 |

The results of Table 2 reveal that relative to the comparative examples, the embodiments of the present invention had lower surface roughness (Ra) of the backcoat layer, had greater luster, were smoother, and had less grime on the guide poles. The initial running coefficients of friction were similar and the change in the coefficient of friction with repeated running was stable. This was attributed to the fact that the backcoat layer was applied as a carbon black coating material obtained by dispersing a mixture comprised of carbon black having a mean primary particle diameter of from 5 to 30 nm, the compound denoted by general formula (I) above, and binder, thus increasing the affinity of the compound of general formula (I) (the derivative portion) with the binder and the carbon black (surface acidic group), increasing dispersibility, preventing dropout of particles such as carbon black, making the layer smooth, and reducing guide pole grime.

In Comparative Example 1, the compound of general formula (I) was not added to the backcoating layer. Compared to the embodiments, luster and surface roughness were poor, guide pole grime was marked, and the coefficient of friction with repeated running was high.

In Comparative Example 2, phthalocyanine compound (1) was added in place of the compound of general formula (I). Compared to the embodiments, luster and surface roughness were poor, the coefficient of friction with repeated running was less stable, and guide pole grime was marked.

Since the magnetic recording medium of the present invention is smooth, generates little grime, and has dropout due to particle fallout and the like, it is suitable not just for use with conventional inductive heads, but also with MR heads in which noise is critical.

The present disclosure relates to the subject matter contained in Japanese Patent Application No. 2000-299711 filed on Sep. 29, 2000, which is expressly incorporated herein by reference in its entirety.

What is claimed is:

1. A magnetic recording medium comprising a layer comprising a granular substance and binder, wherein said layer comprises a compound denoted by general formula I below:

A—N=N—X—Y          General formula (I)

(in general formula (I), A denotes a compound capable of forming an azo dye with X—Y, X denotes a group selected from the divalent connecting groups denoted by the structural formulas given below

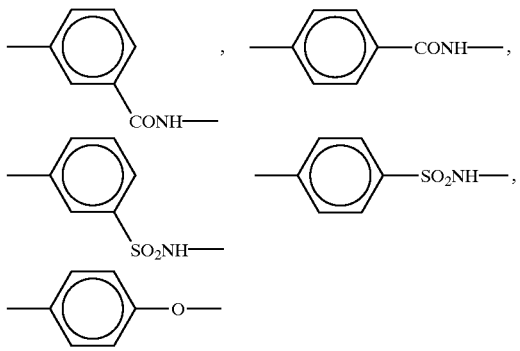

and Y denotes a group denoted by general formula (II) below

General formula (II)

(in general formula (II), Z denotes a lower alkylene group, —NR$_2$ denotes a lower alkylamino group or a nitrogen-comprising five-membered or six-membered saturated heterocyclic ring, and a denotes 1 or 2)).

2. The magnetic recording medium according to claim 1, wherein said granular substance is carbon black and said layer comprising said granular substance and binder is a backcoating layer provided on a nonmagnetic support on the reverse side from the surface on which a magnetic layer is provided.

3. The magnetic recording medium according to claim 2, wherein said magnetic recording medium comprises a nonmagnetic layer and the magnetic layer in this order on the nonmagnetic support.

4. The magnetic recording medium according to claim 3, wherein the compound denoted by general formula (I) is further comprised in the magnetic layer and/or nonmagnetic layer.

5. The magnetic recording medium according to claim 2, wherein an essentially nonmagnetic lower layer and a magnetic layer comprised of a ferromagnetic micropowder dispersed in binder are provided in this order on the nonmagnetic support, the coercivity of the magnetic layer is equal to or higher than $1.43 \times 10^5$ A/m (1,800 Oe), the product of the saturation magnetic flux density and the magnetic layer thickness of the magnetic layer ranges from 5 to 300 (mT μm), and the surface roughness of the magnetic layer ranges from 1.0 to 3.0 nm as the center surface average surface roughness as measured by an optical interference roughness meter.

6. The magnetic recording medium according to claim 5, wherein the compound denoted by general formula (I) is further comprised in the magnetic layer and/or essentially nonmagnetic layer.

7. The magnetic recording medium according to claim 1, wherein said magnetic recording medium has a nonmagnetic support, on one side of which is provided a magnetic layer, and on the other side of which is provided a backcoating layer, wherein the backcoating layer comprises microgranular carbon black with a mean primary particle diameter ranging from 5 to 30 nm, binder, and the compound denoted by the general formula (I).

8. The magnetic recording medium according to claim 7, wherein said microgranular carbon black has a mean primary particle diameter ranging from 5 to 30 nm, a specific surface area ranging from 60 to 800 m$^2$/g, a DBP oil absorption capacity ranging from 50 to 130 mL/100 g, pH ranging from 2 to 11, and a volatile content equal to or less than 15 weight percent.

9. The magnetic recording medium according to claim 1, wherein said magnetic recording medium has a nonmagnetic support, on one side of which is provided a magnetic layer, and on the other side of which is provided a backcoating layer, wherein the backcoating layer comprises microgranular carbon black with a mean primary particle diameter ranging from 5 to 30 nm, coarse granular carbon black with a mean primary particle diameter ranging from 40 to 360 nm, binder, and the compound denoted by the general formula (I).

10. The magnetic recording medium according to claim 9, wherein said microgranular carbon black has a mean primary particle diameter ranging from 5 to 30 nm, a specific surface area ranging from 60 to 800 m$^2$/g, a DBP oil absorption capacity ranging from 50 to 130 mL/100 g, pH ranging from 2 to 11, and a volatile content equal to or less than 15 weight percent.

11. The magnetic recording medium according to claim 9, wherein said coarse granular carbon black has a mean primary particle diameter ranging from 40 to 360 nm, a specific surface area ranging from 5 to 70 m$^2$/g, a DBP oil absorption capacity ranging from 20 to 100 mL/100 g, and pH ranging from 5 to 11.

12. The magnetic recording medium according to claim 1, wherein said magnetic recording medium has a nonmagnetic support, on one side of which is provided a magnetic layer, and on the other side of which is provided a backcoating layer, wherein the backcoating layer is formed by dispersing a mixture of microgranular carbon black with a mean primary particle diameter ranging from 5 to 30 nm, binder, the compound denoted by the general formula (I), and nitrocellulose that has been wetted with any compound from among the group consisting of aromatic hydrocarbon compounds, ketone compounds, and ether compounds to form a carbon black coating material, adding a curing agent thereto, and coating the mixture.

13. The magnetic recording medium according to claim 12, wherein said microgranular carbon black has a mean primary particle diameter ranging from 5 to 30 nm, a specific surface area ranging from 60 to 800 m$^2$/g, a DBP oil absorption capacity ranging from 50 to 130 mL/100 g, pH ranging from 2 to 11, and a volatile content equal to or less than 15 weight percent.

14. The magnetic recording medium according to claim 1, wherein said magnetic recording medium has a nonmagnetic support, on one side of which is provided a magnetic layer, and on the other side of which is provided a backcoating layer, wherein the backcoating layer comprises microgranular carbon black with a mean primary particle diameter ranging from 5 to 30 nm and an inorganic powder with a mean particle diameter ranging from 10 to 250 nm and a Mohs' hardness ranging from 5 to 9, and the surface roughness Ra of the backcoating layer ranges from 2.0 to 15 nm.

15. The magnetic recording medium according to claim 14, wherein said inorganic powder is α-iron oxide or α-alumina.

16. The magnetic recording medium according to claim 14, wherein said microgranular carbon black has a mean primary particle diameter ranging from 5 to 30 nm, a specific surface area ranging from 60 to 800 m$^2$/g, a DBP oil absorption capacity ranging from 50 to 130 mL/100 g, pH ranging from 2 to 11, and a volatile content equal to or less than 15 weight percent.

17. The magnetic recording medium according to claim 1, wherein said magnetic recording medium has a nonmagnetic support, on one side of which is provided a magnetic layer and on the other side of which is provided a backcoating layer, wherein the thickness of the backcoating layer ranges from 0.2 to 8.0 μm, the total thickness of the medium ranges from 3 to 10 μm, and the surface roughness Ra of the backcoating layer ranges from 2.0 to 15 nm.

* * * * *